United States Patent
Katz et al.

(10) Patent No.: US 10,066,068 B2
(45) Date of Patent: Sep. 4, 2018

(54) POLYMERIC ION CONDUCTOR WITH IMPROVED THERMAL CHARACTERISTICS

(71) Applicants: Jeffrey L. Katz, Rome, ME (US); Reuben H. Hudson, Monroe, ME (US)

(72) Inventors: Jeffrey L. Katz, Rome, ME (US); Reuben H. Hudson, Monroe, ME (US)

(*) Notice: Subject to any disclaimer, the term of this patent is extended or adjusted under 35 U.S.C. 154(b) by 0 days.

(21) Appl. No.: 15/204,370

(22) Filed: Jul. 7, 2016

(65) Prior Publication Data

US 2017/0009032 A1    Jan. 12, 2017

Related U.S. Application Data

(60) Provisional application No. 62/189,519, filed on Jul. 7, 2015.

(51) Int. Cl.
| | |
|---|---|
| *C08J 5/22* | (2006.01) |
| *H01M 8/1025* | (2016.01) |
| *C08G 65/40* | (2006.01) |
| *H01M 8/1032* | (2016.01) |
| *H01M 8/1027* | (2016.01) |
| *B01J 39/19* | (2017.01) |
| *C08G 65/48* | (2006.01) |
| *C08G 65/44* | (2006.01) |
| *C08L 71/12* | (2006.01) |
| *H01M 8/1044* | (2016.01) |
| *H01M 8/1018* | (2016.01) |

(52) U.S. Cl.
CPC ............ *C08J 5/2256* (2013.01); *B01J 39/19* (2017.01); *C08G 65/40* (2013.01); *C08G 65/4006* (2013.01); *C08G 65/48* (2013.01); *H01M 8/1025* (2013.01); *H01M 8/1027* (2013.01); *H01M 8/1032* (2013.01); *C08G 2650/38* (2013.01); *C08G 2650/50* (2013.01); *C08G 2650/64* (2013.01); *C08J 2371/10* (2013.01); *H01M 2008/1095* (2013.01)

(58) Field of Classification Search
CPC .......................................................... C08J 5/22
USPC ........................................................ 528/398
See application file for complete search history.

(56) References Cited

U.S. PATENT DOCUMENTS

| | | |
|---|---|---|
| 5,239,107 A | 8/1993 | Shinoda et al. |
| 2005/0159562 A1 | 7/2005 | Hayashi et al. |
| 2007/0259239 A1 | 11/2007 | Endo et al. |

OTHER PUBLICATIONS

Wackerly, et al., "Selective Synthesis of Poly(m-phenylene oxides) over Oxacalixarenes" (2009) Macromolecules, 42, 8181-8186, DOI: 10.1021/ma901518w.

(Continued)

*Primary Examiner* — Duc Truong
(74) *Attorney, Agent, or Firm* — Alexander Akhiezer; Lucas Watkins; Foley Hoag LLP

(57) ABSTRACT

The present disclosure provides polymers comprising at least one repeat unit represented by any one of structural formulas (IA)-(IE) disclosed herein, for example:

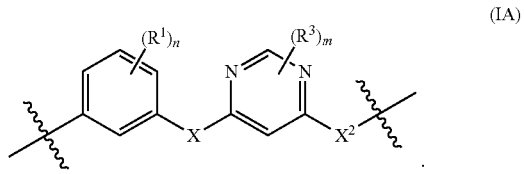

Values for the variables are as disclosed herein. The polymers provided can be employed as ion conductors, for example in fuel cells, and have improved thermal characteristics.

20 Claims, 2 Drawing Sheets

(56) References Cited

OTHER PUBLICATIONS

Hudson, R., "SEES Fellows: Synthesis of a New Class of Thermostable Proton Conducting Materials to Enable High Efficiency Hydrogen Fuel Cells," First Amended Jul. 8, 2014; Last Amended Jul. 5, 2016, <http://www.nsf.gov/awardsearch/showAward?AWD_ID=1415189>.

Matsuo, et al., "Synthesis and properties of new crystalline poly(arylene ether nitriles)," J Polym Sci, 31(13): 3439-3446 (1993).

POLYMERIC ION CONDUCTOR WITH IMPROVED THERMAL CHARACTERISTICS

RELATED APPLICATION

This application claims the benefit of U.S. Provisional Application No. 62/189,519, filed on Jul. 7, 2015. The entire teachings of that application are incorporated herein by reference.

BACKGROUND OF THE INVENTION

Fuel cells continue to garner significant research efforts as a nonpolluting power source for automobiles and other vehicles, as well as portable and stationary electronic devices. Polymer electrolyte membranes (PEMs), to be commercially viable, must permit a high rate of proton conductivity while undergoing minimal degradation under the harshly oxidizing operating conditions of the fuel cell over a wide temperature range. Existing ion-conductive polymers are not practical for use in fuel cells because they either decompose or do not conduct ions well at high temperatures.

SUMMARY OF THE INVENTION

The present invention provides polymers comprising at least one repeat unit represented by any one of structural formulas (IA)-(IE):

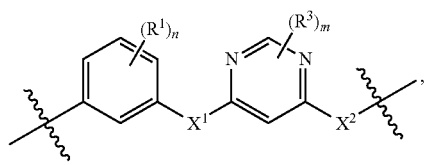
(IA)

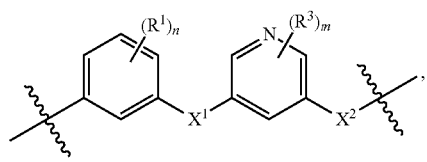
(IB)

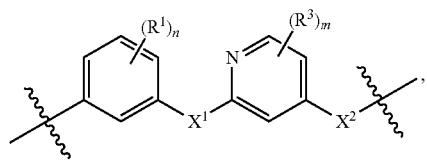
(IC)

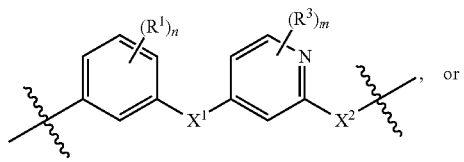
(ID)

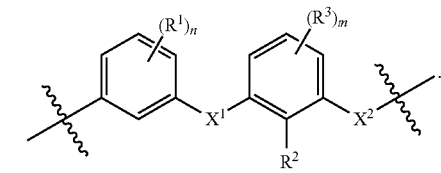
(IE)

In structural formulas (IA)-(IE):

n is, for each occurrence independently, 0, 1, 2, 3, or 4;

m is, for each occurrence independently, 0, 1, 2, or 3;

$X^1$ and $X^2$ are, each independently —O—, —S—, or —(NR$^7$)—;

each instance of $R^1$ is independently selected from $R^6$—COOH, $R^6$—SO$_2$H, $R^6$—SO$_3$H, $R^6$—PO$_2$H$_2$, $R^6$—PO$_3$H$_2$, —P(O)(OR$^4$)$_2$, —S(O$_2$)(OR$^5$), a C$_1$-C$_{20}$ alkyl, a C$_2$-C$_{20}$ alkenyl, a C$_2$-C$_{20}$ alkynyl, a C$_3$-C$_{20}$ cycloalkyl, a 5-20 atom heterocyclyl, a C$_6$-C$_{20}$ aryl, a 5-20 atom heteroaryl, a C$_1$-C$_{20}$ alkoxy, a C$_6$-C$_{20}$ aryloxy, a C$_1$-C$_{20}$ alkylthio, a C$_6$-C$_{20}$ arylthio, a C$_1$-C$_{20}$ sulfone, —(NR$^8$R$^9$)—, a halo, hydroxyl, —CN, nitro, or a C$_1$-C$_{20}$ acyl;

$R^2$ is $R^6$—COOH, $R^6$—SO$_2$H, $R^6$—SO$_3$H, $R^6$—PO$_2$H$_2$, $R^6$—PO$_3$H$_2$, —P(O)(OR$^4$)$_2$, —S(O$_2$)(OR$^5$), a C$_1$-C$_{20}$ alkyl, a C$_2$-C$_{20}$ alkenyl, a C$_2$-C$_{20}$ alkynyl, a C$_3$-C$_{20}$ cycloalkyl, a 5-20 atom heterocyclyl, a C$_6$-C$_{20}$ aryl, a 5-20 atom heteroaryl, a C$_1$-C$_{20}$ alkoxy, a C$_1$-C$_{20}$ alkylthio, a halo, hydroxyl, —CN, nitro, or a C$_1$-C$_{20}$ acyl;

each instance of $R^3$ is independently selected from $R^6$—COOH, $R^6$—SO$_2$H, $R^6$—SO$_3$H, $R^6$—PO$_2$H$_2$, $R^6$—PO$_3$H$_2$, —P(O)(OR$^4$)$_2$, —S(O$_2$)(OR$^5$), a C$_1$-C$_{20}$ alkyl, a C$_2$-C$_{20}$ alkenyl, a C$_2$-C$_{20}$ alkynyl, a C$_3$-C$_{20}$ cycloalkyl, a 5-20 atom heterocyclyl, a C$_6$-C$_{20}$ aryl, a 5-20 atom heteroaryl, a C$_1$-C$_{20}$ alkoxy, a C$_1$-C$_{20}$ alkylthio, a halo, hydroxyl, —CN, nitro, or a C$_1$-C$_{20}$ acyl;

each $R^4$ is, independently, a C$_1$-C$_6$ alkyl, a C$_2$-C$_6$ alkenyl, a C$_2$-C$_6$ alkynyl, or a C$_3$-C$_6$ cycloalkyl;

each $R^5$ is, independently, a C$_1$-C$_6$ alkyl, a C$_2$-C$_6$ alkenyl, a C$_2$-C$_6$ alkynyl, or a C$_3$-C$_6$ cycloalkyl;

each $R^6$ is, independently, a bond, a C$_1$-C$_6$ alkyl, a C$_1$-C$_6$ alkoxy, a C$_2$-C$_6$ alkenyl, a C$_2$-C$_6$ alkynyl, or a C$_3$-C$_6$ cycloalkyl;

$R^7$, $R^8$, and $R^9$, each independently, are H, a C$_1$-C$_{20}$ alkyl, a C$_6$-C$_{20}$ aryl, a 5-20 atom heteroaryl, a C$_1$-C$_{20}$ acyl, or sulfonyl.

In example embodiments, at least one instance of $R^1$, $R^2$, or $R^3$ is $R^6$—COOH, $R^6$—SO$_2$H, $R^6$—SO$_3$H, $R^6$—PO$_2$H$_2$, or $R^6$—PO$_3$H$_2$.

In another embodiment, the present invention is a fuel cell membrane comprising any one or more of the polymers described herein.

DETAILED DESCRIPTION OF THE DRAWINGS

DETAILED DESCRIPTION OF THE INVENTION

Figure 1:
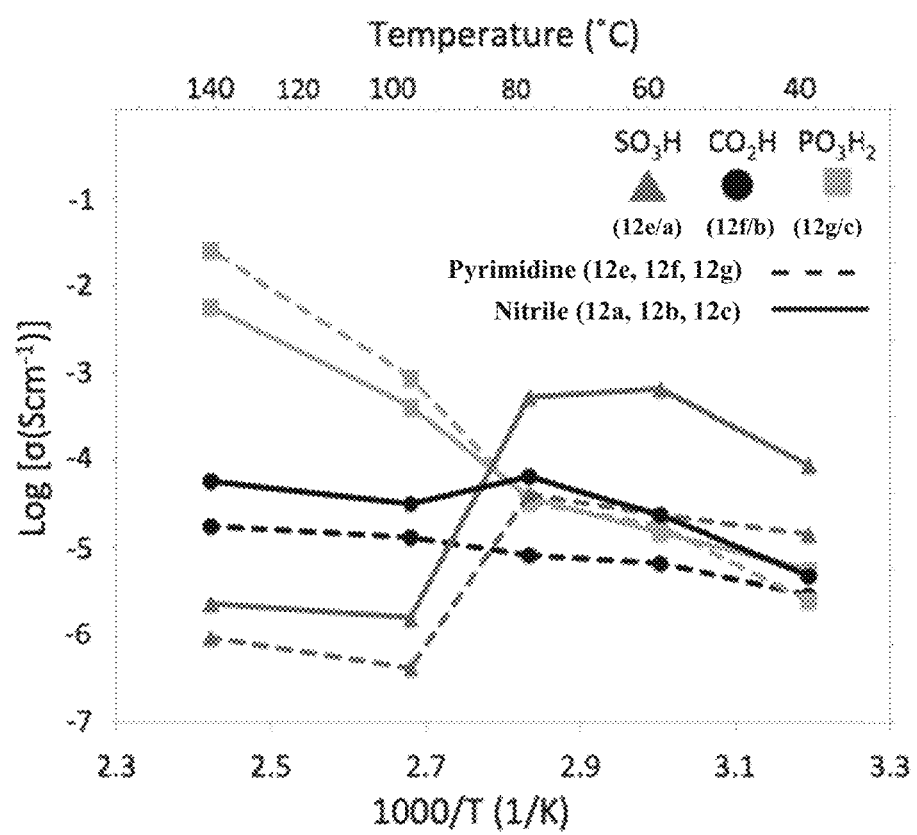
FIG. 1 is a graph showing the conductivity of example embodiments of polymers of the invention at 85% relative humidity ("RH") as a function of temperature over the temperature range 40-140° C.

In a first aspect, the present invention provides polymers comprising at least one repeat unit represented by one of structural formulas (IA)-(IE):

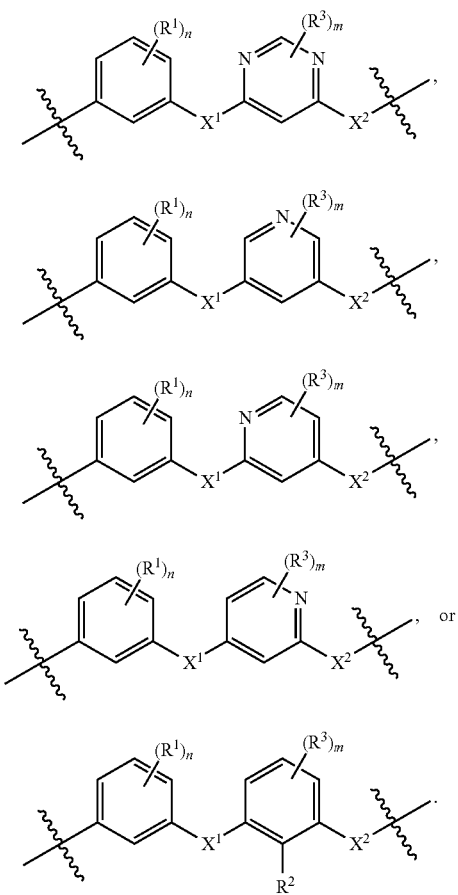

According to the first aspect, n is, for each occurrence independently, 0, 1, 2, 3, or 4. In some embodiments, n is 0. In some embodiments, n is 1. In some embodiments, n is 2. In some embodiments, n is 3. In some embodiments, n is 4. The remainder of the variables in structural formulas (IA)-(IE) are as defined below with respect to the various example embodiments of the first aspect.

According to the first aspect, m is, for each occurrence independently, 0, 1, 2, or 3. In some embodiments, m is 0. In some embodiments, m is 1. In some embodiments, m is 2. In some embodiments, m is 3. The remainder of the variables in structural formulas (IA)-(IE) are as defined above and below with respect to the various example embodiments of the first aspect.

According to the first aspect, $X^1$ and $X^2$ are, each independently, —O—, —S—, or —(NR$^7$)—. In some embodiments, $X^1$ and $X^2$ are both —O—. In some embodiments, $X^1$ and $X^2$ are both —S—. In some embodiments, $X^1$ and $X^2$ are both —(NR$^7$)—. The remainder of the variables in structural formulas (IA)-(IE) are as defined above and below with respect to the first aspect.

According to the first aspect, each $R^1$ is independently selected from $R^6$—COOH, $R^6$—SO$_2$H, $R^6$—SO$_3$H, $R^6$—PO$_2$H$_2$, $R^6$—PO$_3$H$_2$, —P(O)(OR$^4$)$_2$, —S(O$_2$)(OR$^5$), a $C_1$-$C_{20}$ alkyl, a $C_2$-$C_{20}$ alkenyl, a $C_2$-$C_{20}$ alkynyl, a $C_3$-$C_{20}$ cycloalkyl, a 5-20 atom heterocyclyl, a $C_6$-$C_{20}$ aryl, a 5-20 atom heteroaryl, a $C_1$-$C_{20}$ alkoxy, a $C_6$-$C_{20}$ aryloxy, a $C_1$-$C_{20}$ alkylthio, a $C_6$-$C_{20}$ arylthio, a $C_1$-$C_{20}$ sulfone, —(NR$^8$R$^9$)—, a halo, hydroxyl, —CN, nitro, or a $C_1$-$C_{20}$ acyl. In some embodiments, each $R^1$ is, independently, $R^6$—COOH, $R^6$—SO$_2$H, $R^6$—SO$_3$H, $R^6$—PO$_2$H$_2$, $R^6$—PO$_3$H$_2$, —P(O)(OR$^4$)$_2$, a $C_1$-$C_6$ alkyl, a $C_2$-$C_6$ alkenyl, a $C_2$-$C_6$ alkynyl, a $C_3$-$C_{10}$ cycloalkyl, a 5-10 atom heterocyclyl, a $C_6$-$C_{10}$ aryl, a 5-10 atom heteroaryl, a $C_1$-$C_6$ alkoxy, a $C_6$-$C_{10}$ aryloxy, a $C_1$-$C_6$ alkylthio, a $C_6$-$C_{10}$ arylthio, a $C_1$-$C_{10}$ sulfone, —(NR$^8$R$^9$)—, a halo, hydroxyl, —CN, nitro, or a $C_1$-$C_6$ acyl. In some embodiments, each $R^1$ is independently, $R^6$—COOH, $R^6$—SO$_2$H, $R^6$—SO$_3$H, $R^6$—PO$_2$H$_2$, $R^6$—PO$_3$H$_2$, —P(O)(OR$^4$)$_2$, a $C_1$-$C_6$ alkyl, a $C_2$-$C_6$ alkenyl, a $C_2$-$C_6$ alkynyl, a $C_3$-$C_{10}$ cycloalkyl, a 5-10 atom heterocyclyl, a $C_6$-$C_{10}$ aryl, a 5-10 atom heteroaryl, a $C_1$-$C_6$ alkoxy, a $C_1$-$C_6$ alkylthio, a halo, —CN, or nitro. In some embodiments, each $R^1$ is, independently, —COOH, —SO$_2$H, —SO$_3$H, —PO$_3$H$_2$, —PO$_2$H$_2$, —P(O)(OR$^4$)$_2$, a $C_1$-$C_3$ alkyl, phenyl, a $C_1$-$C_3$ alkoxy, a $C_1$-$C_3$ alkylthio, a halo, —CN, or nitro. In some embodiments, each $R^1$ is, independently, —COOH, —SO$_2$H, —SO$_3$H, —PO$_3$H$_2$, —PO$_2$H$_2$, —P(O)(OCH$_2$CH$_3$)$_2$, methyl, trifluoromethyl, methoxy, methylthio, —CN, nitro, phenyl, or fluoro. In some embodiments, at least one instance of $R^1$ is —COOH, SO$_2$H, —SO$_3$H, —PO$_3$H$_2$, or —PO$_2$H$_2$. In some embodiments, at least one instance of $R^1$ is —PO$_3$H$_2$. In some embodiments, n is 1, 2, 3, or 4 and $R^1$ is selected from —COOH, —SO$_2$H, —SO$_3$H, —PO$_3$H$_2$, or —PO$_2$H$_2$. In some embodiments, n is 1 and $R^1$ is —COOH. In some embodiments, n is 1 and $R^1$ is —SO$_2$H. In some embodiments, n is 1 and $R^1$ is —SO$_3$H. In some embodiments, n is 1 and $R^1$ is —PO$_3$H$_2$. In some embodiments, n is 1 and $R^1$ is —PO$_2$H$_2$. The remainder of the variables in structural formulas (IA)-(IE) are as defined above and below with respect to the various example embodiments of the first aspect.

According to the first aspect, each $R^3$ is independently selected from $R^6$—COOH, $R^6$—SO$_2$H, $R^6$—SO$_3$H, $R^6$—PO$_2$H$_2$, $R^6$—PO$_3$H$_2$, —P(O)(OR$^4$)$_2$, —S(O$_2$)(OR$^5$), a $C_1$-$C_{20}$ alkyl, a $C_2$-$C_{20}$ alkenyl, a $C_2$-$C_{20}$ alkynyl, a $C_3$-$C_{20}$ cycloalkyl, a 5-20 atom heterocyclyl, a $C_6$-$C_{20}$ aryl, a 5-20 atom heteroaryl, a $C_1$-$C_{20}$ alkoxy, a $C_6$-$C_{20}$ aryloxy, a $C_1$-$C_{20}$ alkylthio, a $C_6$-$C_{20}$ arylthio, a $C_1$-$C_{20}$ sulfone, —(NR$^8$R$^9$)—, a halo, hydroxyl, —CN, nitro, or a $C_1$-$C_{20}$ acyl. In some embodiments, each $R^3$ is independently, $R^6$—COOH, $R^6$—SO$_2$H, $R^6$—SO$_3$H, $R^6$—PO$_2$H$_2$, $R^6$—PO$_3$H$_2$, —P(O)(OR$^4$)$_2$, a $C_1$-$C_6$ alkyl, a $C_2$-$C_6$ alkenyl, a $C_2$-$C_6$ alkynyl, a $C_3$-$C_{10}$ cycloalkyl, a 5-10 atom heterocyclyl, a $C_6$-$C_{10}$ aryl, a 5-10 atom heteroaryl, a $C_1$-$C_6$ alkoxy, a $C_6$-$C_{10}$ aryloxy, a $C_1$-$C_6$ alkylthio, a $C_6$-$C_{10}$ arylthio, a $C_1$-$C_{10}$ sulfone, —(NR$^8$R$^9$)—, a halo, hydroxyl, —CN, nitro, or a $C_1$-$C_6$ acyl. In some embodiments, each $R^3$ is independently, $R^6$—COOH, $R^6$—SO$_2$H, $R^6$—SO$_3$H, $R^6$—PO$_2$H$_2$, $R^6$—PO$_3$H$_2$, —P(O)(OR$^4$)$_2$, a $C_1$-$C_6$ alkyl, a $C_2$-$C_6$ alkenyl, a $C_2$-$C_6$ alkynyl, a $C_3$-$C_{10}$ cycloalkyl, a 5-10 atom heterocyclyl, a $C_6$-$C_{10}$ aryl, a 5-10 atom heteroaryl, a $C_1$-$C_6$ alkoxy, a $C_1$-$C_6$ alkylthio, a halo, —CN, or nitro. In some embodiments, each $R^3$ is, independently, —COOH, —SO$_2$H, —SO$_3$H, —PO$_3$H$_2$, —PO$_2$H$_2$, —P(O)(OR$^4$)$_2$, a $C_1$-$C_3$ alkyl, phenyl, a $C_1$-$C_3$ alkoxy, a $C_1$-$C_3$ alkylthio, a halo, —CN, or nitro. In some embodiments, each $R^3$ is, independently, —COOH, —SO$_2$H, —SO$_3$H, —PO$_3$H$_2$, —PO$_2$H$_2$, —P(O)(OCH$_2$CH$_3$)$_2$, methyl, trifluoromethyl, methoxy, methylthio, —CN, nitro, phenyl, or fluoro. The remainder of the variables in structural formula I are as defined above and below with respect to the various example embodiments of the first aspect.

According to the first aspect, $R^2$ is $R^6$—COOH, $R^6$—SO$_2$H, $R^6$—SO$_3$H, $R^6$—PO$_2$H$_2$, $R^6$—PO$_3$H$_2$, —P(O)(OR$^4$)$_2$, —S(O$_2$)(OR$^5$), a $C_1$-$C_{20}$ alkyl, a $C_2$-$C_{20}$ alkenyl, a $C_2$-$C_{20}$ alkynyl, a $C_3$-$C_{20}$ cycloalkyl, a 5-20 atom heterocyclyl, a $C_6$-$C_{20}$ aryl, a 5-20 atom heteroaryl, a $C_1$-$C_{20}$ alkoxy, a $C_6$-$C_{20}$ aryloxy, a $C_1$-$C_{20}$ alkylthio, a $C_6$-$C_{20}$ arylthio, a $C_1$-$C_{20}$ sulfone, —$(NR^8R^9)$—, a halo, hydroxyl, —CN, nitro, or a $C_1$-$C_{20}$ acyl. In some embodiments, $R^2$ is $R^6$—COOH, $R^6$—$SO_2H$, $R^6$—$SO_3H$, $R^6$—$PO_2H_2$, $R^6$—$PO_3H_2$, $P(O)(OR^4)_2$, a $C_1$-$C_6$ alkyl, a $C_2$-$C_6$ alkenyl, a $C_2$-$C_6$ alkynyl, a $C_3$-$C_{10}$ cycloalkyl, a 5-10 atom heterocyclyl, a $C_6$-$C_{10}$ aryl, a 5-10 atom heteroaryl, a $C_1$-$C_6$ alkoxy, a $C_6$-$C_{10}$ aryloxy, a $C_1$-$C_6$ alkylthio, a $C_6$-$C_{10}$ arylthio, a $C_1$-$C_{10}$ sulfone, —$(NR^8R^9)$—, a halo, hydroxyl, —CN, nitro, or a $C_1$-$C_6$ acyl. In some embodiments, $R^2$ is —COOH, —$SO_2H$, —$SO_3H$, —$PO_3H_2$, —$PO_2H_2$, —$P(O)(OR^4)_2$, a $C_1$-$C_3$ alkyl, phenyl, a $C_1$-$C_3$ alkoxy, a $C_1$-$C_3$ alkylthio, a halo, —CN, or nitro. In some embodiments, $R^2$ is —COOH, —$SO_2H$, —$SO_3H$, —$PO_3H_2$, —$PO_2H_2$, —$P(O)(OCH_2CH_3)_2$, methyl, trifluoromethyl, methoxy, methylthio, —CN, nitro, phenyl, or fluoro. In some embodiments, $R^2$ is $R^6$—COOH, $R^6$—$SO_2H$, $R^6$—$SO_3H$, $R^6$—$PO_2H_2$, $R^6$—$PO_3H_2$, $P(O)(OR^4)_2$, a $C_1$-$C_6$ alkyl, a $C_2$-$C_6$ alkenyl, a $C_2$-$C_6$ alkynyl, a $C_3$-$C_{10}$ cycloalkyl, a 5-10 atom heterocyclyl, a $C_6$-$C_{10}$ aryl, a 5-10 atom heteroaryl, a $C_1$-$C_6$ alkoxy, a $C_1$-$C_6$ alkylthio, a halo, hydroxyl, nitro, or a $C_1$-$C_6$ acyl. In some embodiments, $R^2$ is —COOH, —$SO_2H$, —$SO_3H$, —$PO_3H_2$, —$PO_2H_2$, —$P(O)(OR^4)_2$, a $C_1$-$C_3$ alkyl, phenyl, a $C_1$-$C_3$ alkoxy, a $C_1$-$C_3$ alkylthio, a halo, or nitro. In some embodiments, $R^2$ is —COOH, —$SO_2H$, —$SO_3H$, —$PO_3H_2$, —$PO_2H_2$, —$P(O)(OCH_2CH_3)_2$, methyl, trifluoromethyl, methoxy, methylthio, nitro, phenyl, or fluoro. The remainder of the variables in structural formulas (IA)-(IE) are as defined above and below with respect to the various example embodiments of the first aspect.

According to the first aspect, each $R^4$ is, independently, a $C_1$-$C_6$ alkyl, a $C_2$-$C_6$ alkenyl, a $C_2$-$C_6$ alkynyl, or a $C_3$-$C_6$ cycloalkyl. In some embodiments, each $R^4$ is, independently, methyl, ethyl, propyl, or isopropyl. In some embodiments, each $R^4$ is methyl. In some embodiments, each $R^4$ is ethyl. In some embodiments, each $R^4$ is propyl. In some embodiments, each $R^4$ is isopropyl. The remainder of the variables in structural formula I are as defined above and below with respect to the various example embodiments of the first aspect.

According to the first aspect, each $R^5$ is, independently, a $C_1$-$C_6$ alkyl, a $C_2$-$C_6$ alkenyl, a $C_2$-$C_6$ alkynyl, or a $C_3$-$C_6$ cycloalkyl. In some embodiments, each $R^5$ is, independently, methyl, ethyl, propyl, or isopropyl. In some embodiments, each $R^5$ is methyl. In some embodiments, each $R^5$ is ethyl. In some embodiments, each $R^5$ is propyl. In some embodiments, each $R^5$ is isopropyl. The remainder of the variables in structural formulas (IA)-(IE) are as defined above and below with respect to the various example embodiments of the first aspect.

According to the first aspect, each $R^6$ is, independently, a single bond, a $C_1$-$C_6$ alkyl, a $C_2$-$C_6$ alkenyl, a $C_2$-$C_6$ alkynyl, a $C_1$-$C_6$ alkoxy, or a $C_3$-$C_6$ cycloalkyl. In some embodiments, each $R^6$ is, independently, a single bond, methyl, ethyl, propyl, or isopropyl. In some embodiments, each $R^6$ is a single bond. In some embodiments, each $R^6$ is methyl. In some embodiments, each $R^6$ is ethyl. In some embodiments, each $R^6$ is propyl. In some embodiments, each $R^6$ is isopropyl. The remainder of the variables in structural formulas (IA)-(IE) are as defined above and below with respect to the various example embodiments of the first aspect.

According to the first aspect, each $R^7$, $R^8$, and $R^9$ is, independently, H, a $C_1$-$C_{20}$ alkyl, a $C_6$-$C_{20}$ aryl, a 5-20 atom heteroaryl, a $C_1$-$C_{20}$ acyl, or sulfonyl. In some embodiments, each $R^7$, $R^8$, and $R^9$ is, independently, H, methyl, ethyl, propyl, or isopropyl. In some embodiments, each $R^7$, $R^8$, and $R^9$ is H. The remainder of the variables in structural formula I are as defined above and below with respect to the various example embodiments of the first aspect.

According to example embodiments of the first aspect, at least one instance of $R^1$, $R^2$, or $R^3$ is $R^6$—COOH, $R^6$—$SO_2H$, $R^6$—$SO_3H$, $R^6$—$PO_2H_2$, or $R^6$—$PO_3H_2$. According to example embodiments of the first aspect, at least one instance of $R^1$, $R^2$, or $R^3$ is $R^6$—COOH. According to example embodiments of the first aspect, at least one instance of $R^1$, $R^2$, or $R^3$ is $R^6$—$SO_2H$. According to example embodiments of the first aspect, at least one instance of $R^1$, $R^2$, or $R^3$ is $R^6$—$SO_3H$. According to example embodiments of the first aspect, at least one instance of $R^1$, $R^2$, or $R^3$ is $R^6$—$PO_2H_2$. According to example embodiments of the first aspect, at least one instance of $R^1$, $R^2$, or $R^3$ is $R^6$—$PO_3H_2$.

In a second aspect, the present invention provides polymers according to the first aspect, wherein the repeat unit is represented by structural formula (II):

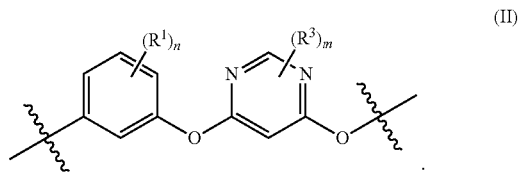

According to the second aspect, n is 0, 1, 2, 3, or 4. In some embodiments, n is 0. In some embodiments, n is 1. In some embodiments, n is 2. In some embodiments, n is 3. In some embodiments, n is 4. The remainder of the variables in structural formula (II) are as defined below with respect to the various example embodiments of the second aspect.

According to the second aspect, m is 0, 1, or 2. In some embodiments, m is 0. In some embodiments, m is 1. In some embodiments, m is 2. The remainder of the variables in structural formula (II) are as defined above and below with respect to the various example embodiments of the second aspect.

According to the second aspect, each $R^1$ is independently selected from $R^6$—COOH, $R^6$—$SO_2H$, $R^6$—$SO_3H$, $R^6$—$PO_2H_2$, $R^6$—$PO_3H_2$, —$P(O)(OR^4)_2$, —$S(O_2)(OR^5)$, a $C_1$-$C_{20}$ alkyl, a $C_2$-$C_{20}$ alkenyl, a $C_2$-$C_{20}$ alkynyl, a $C_3$-$C_{20}$ cycloalkyl, a 5-20 atom heterocyclyl, a $C_6$-$C_{20}$ aryl, a 5-20 atom heteroaryl, a $C_1$-$C_{20}$ alkoxy, a $C_6$-$C_{20}$ aryloxy, a $C_1$-$C_{20}$ alkylthio, a $C_6$-$C_{20}$ arylthio, a $C_1$-$C_{20}$ sulfone, —$(NR^8R^9)$—, a halo, hydroxyl, —CN, nitro, or a $C_1$-$C_{20}$ acyl. In some embodiments, each $R^1$ is, independently, $R^6$—COOH, $R^6$—$SO_2H$, $R^6$—$SO_3H$, $R^6$—$PO_2H_2$, $R^6$—$PO_3H_2$, —$P(O)(OR^4)_2$, a $C_1$-$C_6$ alkyl, a $C_2$-$C_6$ alkenyl, a $C_2$-$C_6$ alkynyl, a $C_3$-$C_{10}$ cycloalkyl, a 5-10 atom heterocyclyl, a $C_6$-$C_{10}$ aryl, a 5-10 atom heteroaryl, a $C_1$-$C_6$ alkoxy, a $C_6$-$C_{10}$ aryloxy, a $C_1$-$C_6$ alkylthio, a $C_6$-$C_{10}$ arylthio, a $C_1$-$C_{10}$ sulfone, —$(NR^8R^9)$—, a halo, hydroxyl, —CN, nitro, or a $C_1$-$C_6$ acyl. In some embodiments, each $R^1$ is, independently, $R^6$—COOH, $R^6$—$SO_2H$, $R^6$—$SO_3H$, $R^6$—$PO_2H_2$, $R^6$—$PO_3H_2$, —$P(O)(OR^4)_2$, a $C_1$-$C_6$ alkyl, a $C_2$-$C_6$ alkenyl, a $C_2$-$C_6$ alkynyl, a $C_3$-$C_{10}$ cycloalkyl, a 5-10 atom heterocyclyl, a $C_6$-$C_{10}$ aryl, a 5-10 atom heteroaryl, a $C_1$-$C_6$ alkoxy, a $C_1$-$C_6$ alkylthio, a halo, —CN, or nitro. In some embodiments, each $R^1$ is, independently, —COOH, —$SO_2H$, —$SO_3H$, —$PO_3H_2$, —$PO_2H_2$, —$P(O)(OR^4)_2$, a $C_1$-$C_3$ alkyl, phenyl, a $C_1$-$C_3$ alkoxy, a $C_1$-$C_3$ alkylthio, a halo, —CN, or nitro. In some embodiments, each $R^1$ is, independently, —COOH, —SO$_2$H, —SO$_3$H, —PO$_3$H$_2$, —PO$_2$H$_2$, —P(O)(OCH$_2$CH$_3$)$_2$, methyl, trifluoromethyl, methoxy, methylthio, —CN, nitro, phenyl, or fluoro. In some embodiments, at least one instance of $R^1$ is —COOH, SO$_2$H, —SO$_3$H, —PO$_3$H$_2$, or —PO$_2$H$_2$. In some embodiments, at least one instance of $R^1$ is —PO$_3$H$_2$. In some embodiments, n is 1 and $R^1$ is selected from —COOH, —SO$_2$H, —SO$_3$H, —PO$_3$H$_2$, or —PO$_2$H$_2$. In some embodiments, n is 1 and $R^1$ is —COOH. In some embodiments, n is 1 and $R^1$ is —SO$_2$H. In some embodiments, n is 1 and $R^1$ is —SO$_3$H. In some embodiments, n is 1 and $R^1$ is —PO$_3$H$_2$. In some embodiments, n is 1 and $R^1$ is —PO$_2$H$_2$. The remainder of the variables in structural formula (II) are as defined above and below with respect to the various example embodiments of the second aspect.

According to the second aspect, each $R^3$ is independently selected from $R^6$—COOH, $R^6$—SO$_2$H, $R^6$—SO$_3$H, $R^6$—PO$_2$H$_2$, $R^6$—PO$_3$H$_2$, —P(O)(OR$^4$)$_2$, —S(O$_2$)(OR$^5$), a $C_1$-$C_{20}$ alkyl, a $C_2$-$C_{20}$ alkenyl, a $C_2$-$C_{20}$ alkynyl, a $C_3$-$C_{20}$ cycloalkyl, a 5-20 atom heterocyclyl, a $C_6$-$C_{20}$ aryl, a 5-20 atom heteroaryl, a $C_1$-$C_{20}$ alkoxy, a $C_6$-$C_{20}$ aryloxy, a $C_1$-$C_{20}$ alkylthio, a $C_6$-$C_{20}$ arylthio, a $C_1$-$C_{20}$ sulfone, —(NR$^8$R$^9$)—, a halo, hydroxyl, —CN, nitro, or a $C_1$-$C_{20}$ acyl. In some embodiments, each $R^3$ is, independently, $R^6$—COOH, $R^6$—SO$_2$H, $R^6$—SO$_3$H, $R^6$—PO$_2$H$_2$, $R^6$—PO$_3$H$_2$, —P(O)(OR$^4$)$_2$, a $C_1$-$C_6$ alkyl, a $C_2$-$C_6$ alkenyl, a $C_2$-$C_6$ alkynyl, a $C_3$-$C_{10}$ cycloalkyl, a 5-10 atom heterocyclyl, a $C_6$-$C_{10}$ aryl, a 5-10 atom heteroaryl, a $C_1$-$C_6$ alkoxy, a $C_6$-$C_{10}$ aryloxy, a $C_1$-$C_6$ alkylthio, a $C_6$-$C_{10}$ arylthio, a $C_1$-$C_{10}$ sulfone, —(NR$^8$R$^9$)—, a halo, hydroxyl, —CN, nitro, or a $C_1$-$C_6$ acyl. In some embodiments, each $R^3$ is, independently, $R^6$—COOH, $R^6$—SO$_2$H, $R^6$—SO$_3$H, $R^6$—PO$_2$H$_2$, $R^6$—PO$_3$H$_2$, —P(O)(OR$^4$)$_2$, a $C_1$-$C_6$ alkyl, a $C_2$-$C_6$ alkenyl, a $C_2$-$C_6$ alkynyl, a $C_3$-$C_{10}$ cycloalkyl, a 5-10 atom heterocyclyl, a $C_6$-$C_{10}$ aryl, a 5-10 atom heteroaryl, a $C_1$-$C_6$ alkoxy, a $C_1$-$C_6$ alkylthio, a halo, —CN, or nitro. In some embodiments, each $R^3$ is, independently, —COOH, —SO$_2$H, —SO$_3$H, —PO$_3$H$_2$, —PO$_2$H$_2$, —P(O)(OR$^4$)$_2$, a $C_1$-$C_3$ alkyl, phenyl, a $C_1$-$C_3$ alkoxy, a $C_1$-$C_3$ alkylthio, a halo, —CN, or nitro. In some embodiments, each $R^3$ is, independently, —COOH, —SO$_2$H, —SO$_3$H, —PO$_3$H$_2$, —PO$_2$H$_2$, —P(O)(OCH$_2$CH$_3$)$_2$, methyl, trifluoromethyl, methoxy, methylthio, —CN, nitro, phenyl, or fluoro. The remainder of the variables in structural formula (II) are as defined above with respect to the various example embodiments of the second aspect.

In a third aspect, the present invention provides polymers according to the first aspect, wherein the repeat unit is represented by structural formula (III):

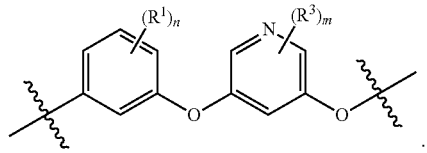

(III)

According to the third aspect, n is 0, 1, 2, 3, or 4. In some embodiments, n is 0. In some embodiments, n is 1. In some embodiments, n is 2. In some embodiments, n is 3. In some embodiments, n is 4. The remainder of the variables in structural formula (III) are as defined below with respect to the various example embodiments of the third aspect.

According to the third aspect, m is 0, 1, 2, or 3. In some embodiments, m is 0. In some embodiments, m is 1. In some embodiments, m is 2. In some embodiments, m is 3. The remainder of the variables in structural formula (III) are as defined above and below with respect to the various example embodiments of the third aspect.

According to the third aspect, each R is independently selected from $R^6$—COOH, $R^6$—SO$_2$H, $R^6$—SO$_3$H, $R^6$—PO$_2$H$_2$, $R^6$—PO$_3$H$_2$, —P(O)(OR$^4$)$_2$, —S(O$_2$)(OR$^5$), a $C_1$-$C_{20}$ alkyl, a $C_2$-$C_{20}$ alkenyl, a $C_2$-$C_{20}$ alkynyl, a $C_3$-$C_{20}$ cycloalkyl, a 5-20 atom heterocyclyl, a $C_6$-$C_{20}$ aryl, a 5-20 atom heteroaryl, a $C_1$-$C_{20}$ alkoxy, a $C_6$-$C_{20}$ aryloxy, a $C_1$-$C_{20}$ alkylthio, a $C_6$-$C_{20}$ arylthio, a $C_1$-$C_{20}$ sulfone, —(NR$^8$R$^9$)—, a halo, hydroxyl, —CN, nitro, or a $C_1$-$C_{20}$ acyl. In some embodiments, each $R^1$ is, independently, $R^6$—COOH, $R^6$—SO$_2$H, $R^6$—SO$_3$H, $R^6$—PO$_2$H$_2$, $R^6$—PO$_3$H$_2$, —P(O)(OR$^4$)$_2$, a $C_1$-$C_6$ alkyl, a $C_2$-$C_6$ alkenyl, a $C_2$-$C_6$ alkynyl, a $C_3$-$C_{10}$ cycloalkyl, a 5-10 atom heterocyclyl, a $C_6$-$C_{10}$ aryl, a 5-10 atom heteroaryl, a $C_1$-$C_6$ alkoxy, a $C_6$-$C_{10}$ aryloxy, a $C_1$-$C_6$ alkylthio, a $C_6$-$C_{10}$ arylthio, a $C_1$-$C_{10}$ sulfone, —(NR$^8$R$^9$)—, a halo, hydroxyl, —CN, nitro, or a $C_1$-$C_6$ acyl. In some embodiments, each $R^1$ is, independently, $R^6$—COOH, $R^6$—SO$_2$H, $R^6$—SO$_3$H, $R^6$—PO$_2$H$_2$, $R^6$—PO$_3$H$_2$, —P(O)(OR$^4$)$_2$, a $C_1$-$C_6$ alkyl, a $C_2$-$C_6$ alkenyl, a $C_2$-$C_6$ alkynyl, a $C_3$-$C_{10}$ cycloalkyl, a 5-10 atom heterocyclyl, a $C_6$-$C_{10}$ aryl, a 5-10 atom heteroaryl, a $C_1$-$C_6$ alkoxy, a $C_1$-$C_6$ alkylthio, a halo, —CN, or nitro. In some embodiments, each $R^1$ is, independently, —COOH, —SO$_2$H, —SO$_3$H, —PO$_3$H$_2$, —PO$_2$H$_2$, —P(O)(OR$^4$)$_2$, a $C_1$-$C_3$ alkyl, phenyl, a $C_1$-$C_3$ alkoxy, a $C_1$-$C_3$ alkylthio, a halo, —CN, or nitro. In some embodiments, each $R^1$ is, independently, —COOH, —SO$_2$H, —SO$_3$H, —PO$_3$H$_2$, —PO$_2$H$_2$, —P(O)(OCH$_2$CH$_3$)$_2$, methyl, trifluoromethyl, methoxy, methylthio, —CN, nitro, phenyl, or fluoro. In some embodiments, at least one instance of $R^1$ is —COOH, SO$_2$H, —SO$_3$H, —PO$_3$H$_2$, or —PO$_2$H$_2$. In some embodiments, at least one instance of $R^1$ is —PO$_3$H$_2$. In some embodiments, n is 1 and $R^1$ is selected from —COOH, —SO$_2$H, —SO$_3$H, —PO$_3$H$_2$, or —PO$_2$H$_2$. In some embodiments, n is 1 and $R^1$ is —COOH. In some embodiments, n is 1 and $R^1$ is —SO$_2$H. In some embodiments, n is 1 and $R^1$ is —SO$_3$H. In some embodiments, n is 1 and $R^1$ is —PO$_3$H$_2$. In some embodiments, n is 1 and $R^1$ is —PO$_2$H$_2$. The remainder of the variables in structural formula (III) are as defined above and below with respect to the various example embodiments of the third aspect.

According to the third aspect, each $R^3$ is independently selected from $R^6$—COOH, $R^6$—SO$_2$H, $R^6$—SO$_3$H, $R^6$—PO$_2$H$_2$, $R^6$—PO$_3$H$_2$, —P(O)(OR$^4$$_2$, —S(O$_2$)(OR$^5$), a $C_1$-$C_{20}$ alkyl, a $C_2$-$C_{20}$ alkenyl, a $C_2$-$C_{20}$ alkynyl, a $C_3$-$C_{20}$ cycloalkyl, a 5-20 atom heterocyclyl, a $C_6$-$C_{20}$ aryl, a 5-20 atom heteroaryl, a $C_1$-$C_{20}$ alkoxy, a $C_6$-$C_{20}$ aryloxy, a $C_1$-$C_{20}$ alkylthio, a $C_6$-$C_{20}$ arylthio, a $C_1$-$C_{20}$ sulfone, —(NR$^8$R$^9$)—, a halo, hydroxyl, —CN, nitro, or a $C_1$-$C_{20}$ acyl. In some embodiments, each $R^3$ is, independently, $R^6$—COOH, $R^6$—SO$_2$H, $R^6$—SO$_3$H, $R^6$—PO$_2$H$_2$, $R^6$—PO$_3$H$_2$, —P(O)(OR$^4$)$_2$, a $C_1$-$C_6$ alkyl, a $C_2$-$C_6$ alkenyl, a $C_2$-$C_6$ alkynyl, a $C_3$-$C_{10}$ cycloalkyl, a 5-10 atom heterocyclyl, a $C_6$-$C_{10}$ aryl, a 5-10 atom heteroaryl, a $C_1$-$C_6$ alkoxy, a $C_6$-$C_{10}$ aryloxy, a $C_1$-$C_6$ alkylthio, a $C_6$-$C_{10}$ arylthio, a $C_1$-$C_{10}$ sulfone, —(NR$^8$R$^9$)—, a halo, hydroxyl, —CN, nitro, or a $C_1$-$C_6$ acyl. In some embodiments, each $R^3$ is, independently, $R^6$—COOH, $R^6$—SO$_2$H, $R^6$—SO$_3$H, $R^6$—PO$_2$H$_2$, $R^6$—PO$_3$H$_2$, —P(O)(OR$^4$)$_2$, a $C_1$-$C_6$ alkyl, a $C_2$-$C_6$ alkenyl, a $C_2$-$C_6$ alkynyl, a $C_3$-$C_{10}$ cycloalkyl, a 5-10 atom heterocyclyl, a $C_6$-$C_{10}$ aryl, a 5-10 atom heteroaryl, a $C_1$-$C_6$ alkoxy, a $C_1$-$C_6$ alkylthio, a halo, —CN, or nitro. In some embodiments, each $R^3$ is, independently, —COOH, —$SO_2H$, —$SO_3H$, —$PO_3H_2$, —$PO_2H_2$, —$P(O)(OR^4)_2$, a $C_1$-$C_3$ alkyl, phenyl, a $C_1$-$C_3$ alkoxy, a $C_1$-$C_3$ alkylthio, a halo, —CN, or nitro. In some embodiments, each $R^3$ is, independently, —COOH, —$SO_2H$, —$SO_3H$, —$PO_3H_2$, —$PO_2H_2$, —$P(O)(OCH_2CH_3)_2$, methyl, trifluoromethyl, methoxy, methylthio, —CN, nitro, phenyl, or fluoro. The remainder of the variables in structural formula (III) are as defined above with respect to the various example embodiments of the third aspect.

In a fourth aspect, the present invention provides polymers according to the first aspect, wherein the repeat unit is represented by structural formula (IV) or structural formula (V):

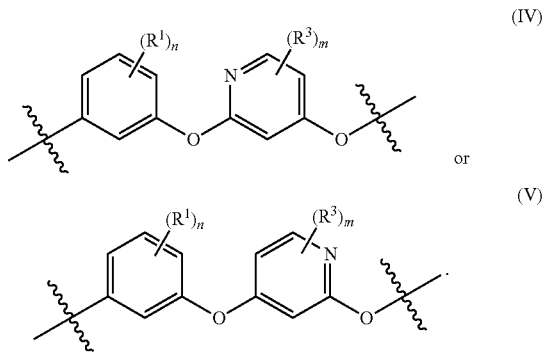

According to the fourth aspect, n is, for each occurrence independently, 0, 1, 2, 3, or 4. In some embodiments, n is 0. In some embodiments, n is 1. In some embodiments, n is 2. In some embodiments, n is 3. In some embodiments, n is 4. The remainder of the variables in structural formulas (IV) and (V) are as defined below with respect to the various example embodiments of the fourth aspect.

According to the fourth aspect, m is, for each occurrence independently, 0, 1, 2, or 3. In some embodiments, m is 0. In some embodiments, m is 1. In some embodiments, m is 2. In some embodiments, m is 3. The remainder of the variables in structural formulas (IV) and (V) are as defined above and below with respect to the various example embodiments of the fourth aspect.

According to the fourth aspect, each $R^1$ is independently selected from $R^6$—COOH, $R^6$—$SO_2H$, $R^6$—$SO_3H$, $R^6$—$PO_2H_2$, $R^6$—$PO_3H_2$, —$P(O)(OR^4)_2$, —$S(O_2)(OR^5)$, a $C_1$-$C_{20}$ alkyl, a $C_2$-$C_{20}$ alkenyl, a $C_2$-$C_{20}$ alkynyl, a $C_3$-$C_{20}$ cycloalkyl, a 5-20 atom heterocyclyl, a $C_6$-$C_{20}$ aryl, a 5-20 atom heteroaryl, a $C_1$-$C_{20}$ alkoxy, a $C_6$-$C_{20}$ aryloxy, a $C_1$-$C_{20}$ alkylthio, a $C_6$-$C_{20}$ arylthio, a $C_1$-$C_{20}$ sulfone, —$(NR^8R^9)$—, a halo, hydroxyl, —CN, nitro, or a $C_1$-$C_{20}$ acyl. In some embodiments, each $R^1$ is, independently, $R^6$—COOH, $R^6$—$SO_2H$, $R^6$—$SO_3H$, $R^6$—$PO_2H_2$, $R^6$—$PO_3H_2$, —$P(O)(OR^4)_2$, a $C_1$-$C_6$ alkyl, a $C_2$-$C_6$ alkenyl, a $C_2$-$C_6$ alkynyl, a $C_3$-$C_{10}$ cycloalkyl, a 5-10 atom heterocyclyl, a $C_6$-$C_{10}$ aryl, a 5-10 atom heteroaryl, a $C_1$-$C_6$ alkoxy, a $C_6$-$C_{10}$ aryloxy, a $C_1$-$C_6$ alkylthio, a $C_6$-$C_{10}$ arylthio, a $C_1$-$C_{10}$ sulfone, —$(NR^8R^9)$—, a halo, hydroxyl, —CN, nitro, or a $C_1$-$C_6$ acyl. In some embodiments, each $R^1$ is, independently, $R^6$—COOH, $R^6$—$SO_2H$, $R^6$—$SO_3H$, $R^6$—$PO_2H_2$, $R^6$—$PO_3H_2$, —$P(O)(OR^4)_2$, a $C_1$-$C_6$ alkyl, a $C_2$-$C_6$ alkenyl, a $C_2$-$C_6$ alkynyl, a $C_3$-$C_{10}$ cycloalkyl, a 5-10 atom heterocyclyl, a $C_6$-$C_{10}$ aryl, a 5-10 atom heteroaryl, a $C_1$-$C_6$ alkoxy, a $C_1$-$C_6$ alkylthio, a halo, —CN, or nitro. In some embodiments, each $R^1$ is, independently, —COOH, —$SO_2H$, —$SO_3H$, —$PO_3H_2$, —$PO_2H_2$, —$P(O)(OR^4)_2$, a $C_1$-$C_3$ alkyl, phenyl, a $C_1$-$C_3$ alkoxy, a $C_1$-$C_3$ alkylthio, a halo, —CN, or nitro. In some embodiments, each $R^1$ is, independently, —COOH, —$SO_2H$, —$SO_3H$, —$PO_3H_2$, —$PO_2H_2$, —$P(O)(OCH_2CH_3)_2$, methyl, trifluoromethyl, methoxy, methylthio, —CN, nitro, phenyl, or fluoro. In some embodiments, at least one instance of $R^1$ is —COOH, —$SO_2H$, —$SO_3H$, —$PO_3H_2$, or —$PO_2H_2$. In some embodiments, at least one instance of $R^1$ is —$PO_3H_2$. In some embodiments, n is 1 and $R^1$ is selected from —COOH, —$SO_2H$, —$SO_3H$, —$PO_3H_2$, or —$PO_2H_2$. In some embodiments, n is 1 and $R^1$ is —COOH. In some embodiments, n is 1 and $R^1$ is —$SO_2H$. In some embodiments, n is 1 and $R^1$ is —$SO_3H$. In some embodiments, n is 1 and $R^1$ is —$PO_3H_2$. In some embodiments, n is 1 and $R^1$ is —$PO_2H_2$. The remainder of the variables in structural formulas (IV) and (V) are as defined above and below with respect to the various example embodiments of the fourth aspect.

According to the fourth aspect, each $R^3$ is independently selected from $R^6$—COOH, $R^6$—$SO_2H$, $R^6$—$SO_3H$, $R^6$—$PO_2H_2$, $R^6$—$PO_3H_2$, —$P(O)(OR^4)_2$, —$S(O_2)(OR^5)$, a $C_1$-$C_{20}$ alkyl, a $C_2$-$C_{20}$ alkenyl, a $C_2$-$C_{20}$ alkynyl, a $C_3$-$C_{20}$ cycloalkyl, a 5-20 atom heterocyclyl, a $C_6$-$C_{20}$ aryl, a 5-20 atom heteroaryl, a $C_1$-$C_{20}$ alkoxy, a $C_6$-$C_{20}$ aryloxy, a $C_1$-$C_{20}$ alkylthio, a $C_6$-$C_{20}$ arylthio, a $C_1$-$C_{20}$ sulfone, —$(NR^8R^9)$—, a halo, hydroxyl, —CN, nitro, or a $C_1$-$C_{20}$ acyl. In some embodiments, each $R^3$ is, independently, $R^6$—COOH, $R^6$—$SO_2H$, $R^6$—$SO_3H$, $R^6$—$PO_2H_2$, $R^6$—$PO_3H_2$, —$P(O)(OR^4)_2$, a $C_1$-$C_6$ alkyl, a $C_2$-$C_6$ alkenyl, a $C_2$-$C_6$ alkynyl, a $C_3$-$C_{10}$ cycloalkyl, a 5-10 atom heterocyclyl, a $C_6$-$C_{10}$ aryl, a 5-10 atom heteroaryl, a $C_1$-$C_6$ alkoxy, a $C_6$-$C_{10}$ aryloxy, a $C_1$-$C_6$ alkylthio, a $C_6$-$C_{10}$ arylthio, a $C_1$-$C_{10}$ sulfone, —$(NR^8R^9)$—, a halo, hydroxyl, —CN, nitro, or a $C_1$-$C_6$ acyl. In some embodiments, each $R^3$ is, independently, $R^6$—COOH, $R^6$—$SO_2H$, $R^6$—$SO_3H$, $R^6$—$PO_2H_2$, $R^6$—$PO_3H_2$, —$P(O)(OR^4)_2$, a $C_1$-$C_6$ alkyl, a $C_2$-$C_6$ alkenyl, a $C_2$-$C_6$ alkynyl, a $C_3$-$C_{10}$ cycloalkyl, a 5-10 atom heterocyclyl, a $C_6$-$C_{10}$ aryl, a 5-10 atom heteroaryl, a $C_1$-$C_6$ alkoxy, a $C_1$-$C_6$ alkylthio, a halo, —CN, or nitro. In some embodiments, each $R^3$ is, independently, —COOH, —$SO_2H$, —$SO_3H$, —$PO_3H_2$, —$PO_2H_2$, —$P(O)(OR^4)_2$, a $C_1$-$C_3$ alkyl, phenyl, a $C_1$-$C_3$ alkoxy, a $C_1$-$C_3$ alkylthio, a halo, —CN, or nitro. In some embodiments, each $R^3$ is, independently, —COOH, —$SO_2H$, —$SO_3H$, —$PO_3H_2$, —$PO_2H_2$, —$P(O)(OCH_2CH_3)_2$, methyl, trifluoromethyl, methoxy, methylthio, —CN, nitro, phenyl, or fluoro. The remainder of the variables in structural formulas (IV) and (V) are as defined above with respect to the various example embodiments of the fourth aspect.

In a fifth aspect, the present invention provides polymers according to the first aspect, wherein the repeat unit is represented by structural formula (VI):

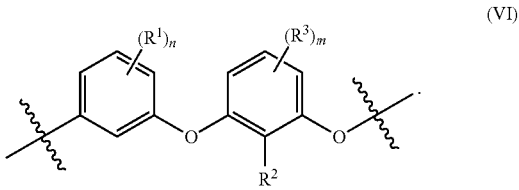

According to the fifth aspect, n is 0, 1, 2, 3, or 4. In some embodiments, n is 0. In some embodiments, n is 1. In some embodiments, n is 2. In some embodiments, n is 3. In some embodiments, n is 4. The remainder of the variables in structural formula (VI) are as defined below with respect to the various example embodiments of the fifth aspect.

According to the fifth aspect, m is 0, 1, 2, or 3. In some embodiments, m is 0. In some embodiments, m is 1. In some embodiments, m is 2. In some embodiments, m is 3. The remainder of the variables in structural formula (VI) are as defined above and below with respect to the various example embodiments of the fifth aspect.

According to the fifth aspect, each $R^1$ is independently selected from $R^6$—COOH, $R^6$—$SO_2H$, $R^6$—$SO_3H$, $R^6$—$PO_2H_2$, $R^6$—$PO_3H_2$, —P(O)(OR$^4$)$_2$, —S(O$_2$)(OR$^5$), a $C_1$-$C_{20}$ alkyl, a $C_2$-$C_{20}$ alkenyl, a $C_2$-$C_{20}$ alkynyl, a $C_3$-$C_{20}$ cycloalkyl, a 5-20 atom heterocyclyl, a $C_6$-$C_{20}$ aryl, a 5-20 atom heteroaryl, a $C_1$-$C_{20}$ alkoxy, a $C_6$-$C_{20}$ aryloxy, a $C_1$-$C_{20}$ alkylthio, a $C_6$-$C_{20}$ arylthio, a $C_1$-$C_{20}$ sulfone, —(NR$^8$R$^9$)—, a halo, hydroxyl, —CN, nitro, or a $C_1$-$C_{20}$ acyl. In some embodiments, each $R^1$ is, independently, $R^6$—COOH, $R^6$—$SO_2H$, $R^6$—$SO_3H$, $R^6$—$PO_2H_2$, $R^6$—$PO_3H_2$, —P(O)(OR$^4$)$_2$, a $C_1$-$C_6$ alkyl, a $C_2$-$C_6$ alkenyl, a $C_2$-$C_6$ alkynyl, a $C_3$-$C_{10}$ cycloalkyl, a 5-10 atom heterocyclyl, a $C_6$-$C_{10}$ aryl, a 5-10 atom heteroaryl, a $C_1$-$C_6$ alkoxy, a $C_6$-$C_{10}$ aryloxy, a $C_1$-$C_6$ alkylthio, a $C_6$-$C_{10}$ arylthio, a $C_1$-$C_{10}$ sulfone, —(NR$^8$R$^9$)—, a halo, hydroxyl, —CN, nitro, or a $C_1$-$C_6$ acyl. In some embodiments, each $R^1$ is, independently, $R^6$—COOH, $R^6$—$SO_2H$, $R^6$—$SO_3H$, $R^6$—$PO_2H_2$, $R^6$—$PO_3H_2$, —P(O)(OR$^4$)$_2$, a $C_1$-$C_6$ alkyl, a $C_2$-$C_6$ alkenyl, a $C_2$-$C_6$ alkynyl, a $C_3$-$C_{10}$ cycloalkyl, a 5-10 atom heterocyclyl, a $C_6$-$C_{10}$ aryl, a 5-10 atom heteroaryl, a $C_1$-$C_6$ alkoxy, a $C_1$-$C_6$ alkylthio, a halo, —CN, or nitro. In some embodiments, each $R^1$ is, independently, —COOH, —$SO_2H$, —$SO_3H$, —$PO_3H_2$, —$PO_2H_2$, —P(O)(OR$^4$)$_2$, a $C_1$-$C_3$ alkyl, phenyl, a $C_1$-$C_3$ alkoxy, a $C_1$-$C_3$ alkylthio, a halo, —CN, or nitro. In some embodiments, each $R^1$ is, independently, —COOH, —$SO_2H$, —$SO_3H$, —$PO_3H_2$, —$PO_2H_2$, —P(O)(OCH$_2$CH$_3$)$_2$, methyl, trifluoromethyl, methoxy, methylthio, —CN, nitro, phenyl, or fluoro. In some embodiments, at least one instance of $R^1$ is —COOH, $SO_2H$, —$SO_3H$, —$PO_3H_2$, or —$PO_2H_2$. In some embodiments, at least one instance of $R^1$ is —$PO_3H_2$. In some embodiments, n is 1 and $R^1$ is selected from —COOH, —$SO_2H$, —$SO_3H$, —$PO_3H_2$, or —$PO_2H_2$. In some embodiments, n is 1 and $R^1$ is —COOH. In some embodiments, n is 1 and $R^1$ is —$SO_2H$. In some embodiments, n is 1 and $R^1$ is —$SO_3H$. In some embodiments, n is 1 and $R^1$ is —$PO_3H_2$. In some embodiments, n is 1 and $R^1$ is —$PO_2H_2$. The remainder of the variables in structural formula (VI) are as defined above and below with respect to the various example embodiments of the fifth aspect.

According to the fifth aspect, $R^2$ is $R^6$—COOH, $R^6$—$SO_2H$, $R^6$—$SO_3H$, $R^6$—$PO_2H_2$, $R^6$—$PO_3H_2$, —P(O)(OR$^4$)$_2$, —S(O$_2$)(OR$^5$), a $C_1$-$C_{20}$ alkyl, a $C_2$-$C_{20}$ alkenyl, a $C_2$-$C_{20}$ alkynyl, a $C_3$-$C_{20}$ cycloalkyl, a 5-20 atom heterocyclyl, a $C_6$-$C_{20}$ aryl, a 5-20 atom heteroaryl, a $C_1$-$C_{20}$ alkoxy, a $C_6$-$C_{20}$ aryloxy, a $C_1$-$C_{20}$ alkylthio, a $C_6$-$C_{20}$ arylthio, a $C_1$-$C_{20}$ sulfone, —(NR$^8$R$^9$)—, a halo, hydroxyl, —CN, nitro, or a $C_1$-$C_{20}$ acyl. In some embodiments, $R^2$ is $R^6$—COOH, $R^6$—$SO_2H$, $R^6$—$SO_3H$, $R^6$—$PO_2H_2$, $R^6$—$PO_3H_2$, P(O)(OR$^4$)$_2$, a $C_1$-$C_6$ alkyl, a $C_2$-$C_6$ alkenyl, a $C_2$-$C_6$ alkynyl, a $C_3$-$C_{10}$ cycloalkyl, a 5-10 atom heterocyclyl, a $C_6$-$C_{10}$ aryl, a 5-10 atom heteroaryl, a $C_1$-$C_6$ alkoxy, a $C_6$-$C_{10}$ aryloxy, a $C_1$-$C_6$ alkylthio, a $C_6$-$C_{10}$ arylthio, a $C_1$-$C_{10}$ sulfone, —(NR$^8$R$^9$)—, a halo, hydroxyl, —CN, nitro, or a $C_1$-$C_6$ acyl. In some embodiments, $R^2$ is —COOH, —$SO_2H$, —$SO_3H$, —$PO_3H_2$, —$PO_2H_2$, —P(O)(OR$^4$)$_2$, a $C_1$-$C_3$ alkyl, phenyl, a $C_1$-$C_3$ alkoxy, a $C_1$-$C_3$ alkylthio, a halo, —CN, or nitro. In some embodiments, $R^2$ is —COOH, —$SO_2H$, —$SO_3H$, —$PO_3H_2$, —$PO_2H_2$, —P(O)(OCH$_2$CH$_3$)$_2$, methyl, trifluoromethyl, methoxy, methylthio, —CN, nitro, phenyl, or fluoro. In some embodiments, $R^2$ is $R^6$—COOH, $R^6$—$SO_2H$, $R^6$—$SO_3H$, $R^6$—$PO_2H_2$, $R^6$—$PO_3H_2$, P(O)(OR$^4$)$_2$, a $C_1$-$C_6$ alkyl, a $C_2$-$C_6$ alkenyl, a $C_2$-$C_6$ alkynyl, a $C_3$-$C_{10}$ cycloalkyl, a 5-10 atom heterocyclyl, a $C_6$-$C_{10}$ aryl, a 5-10 atom heteroaryl, a $C_1$-$C_6$ alkoxy, a $C_1$-$C_6$ alkylthio, a halo, hydroxyl, nitro, or a $C_1$-$C_6$ acyl. In some embodiments, $R^2$ is —COOH, —$SO_2H$, —$SO_3H$, —$PO_3H_2$, —$PO_2H_2$, —P(O)(OR$^4$)$_2$, a $C_1$-$C_3$ alkyl, phenyl, a $C_1$-$C_3$ alkoxy, a $C_1$-$C_3$ alkylthio, a halo, or nitro. In some embodiments, $R^2$ is —COOH, —$SO_2H$, —$SO_3H$, —$PO_3H_2$, —$PO_2H_2$, —P(O)(OCH$_2$CH$_3$)$_2$, methyl, trifluoromethyl, methoxy, methylthio, nitro, phenyl, or fluoro. The remainder of the variables in structural formula (VI) are as defined above with respect to the various example embodiments of the fifth aspect.

According to the fifth aspect, each $R^3$ is independently selected from $R^6$—COOH, $R^6$—$SO_2H$, $R^6$—$SO_3H$, $R^6$—$PO_2H_2$, $R^6$—$PO_3H_2$, —P(O)OR$^4$)$_2$, —S(O$_2$)(OR$^5$), a $C_1$-$C_{20}$ alkyl, a $C_2$-$C_{20}$ alkenyl, a $C_2$-$C_{20}$ alkynyl, a $C_3$-$C_{20}$ cycloalkyl, a 5-20 atom heterocyclyl, a $C_6$-$C_{20}$ aryl, a 5-20 atom heteroaryl, a $C_1$-$C_{20}$ alkoxy, a $C_6$-$C_{20}$ aryloxy, a $C_1$-$C_{20}$ alkylthio, a $C_6$-$C_{20}$ arylthio, a $C_1$-$C_{20}$ sulfone, —(NR$^8$R$^9$)—, a halo, hydroxyl, —CN, nitro, or a $C_1$-$C_{20}$ acyl. In some embodiments, each $R^3$ is, independently, $R^6$—COOH, $R^6$—$SO_2H$, $R^6$—$SO_3H$, $R^6$—$PO_2H_2$, $R^6$—$PO_3H_2$, —P(O)(OR$^4$)$_2$, a $C_1$-$C_6$ alkyl, a $C_2$-$C_6$ alkenyl, a $C_2$-$C_6$ alkynyl, a $C_3$-$C_{10}$ cycloalkyl, a 5-10 atom heterocyclyl, a $C_6$-$C_{10}$ aryl, a 5-10 atom heteroaryl, a $C_1$-$C_6$ alkoxy, a $C_6$-$C_{10}$ aryloxy, a $C_1$-$C_6$ alkylthio, a $C_6$-$C_{10}$ arylthio, a $C_1$-$C_{10}$ sulfone, —(NR$^8$R$^9$)—, a halo, hydroxyl, —CN, nitro, or a $C_1$-$C_6$ acyl. In some embodiments, each $R^3$ is, independently, $R^6$—COOH, $R^6$—$SO_2H$, $R^6$—$SO_3H$, $R^6$—$PO_2H_2$, $R^6$—$PO_3H_2$, —P(O)(OR$^4$)$_2$, a $C_1$-$C_6$ alkyl, a $C_2$-$C_6$ alkenyl, a $C_2$-$C_6$ alkynyl, a $C_3$-$C_{10}$ cycloalkyl, a 5-10 atom heterocyclyl, a $C_6$-$C_{10}$ aryl, a 5-10 atom heteroaryl, a $C_1$-$C_6$ alkoxy, a $C_1$-$C_6$ alkylthio, a halo, —CN, or nitro. In some embodiments, each $R^3$ is, independently, —COOH, —$SO_2H$, —$SO_3H$, —$PO_3H_2$, —$PO_2H_2$, —P(O)(OR$^4$)$_2$, a $C_1$-$C_3$ alkyl, phenyl, a $C_1$-$C_3$ alkoxy, a $C_1$-$C_3$ alkylthio, a halo, —CN, or nitro. In some embodiments, each $R^3$ is, independently, —COOH, —$SO_2H$, —$SO_3H$, —$PO_3H_2$, —$PO_2H_2$, —P(O)(OCH$_2$CH$_3$)$_2$, methyl, trifluoromethyl, methoxy, methylthio, —CN, nitro, phenyl, or fluoro. The remainder of the variables in structural formula (VI) are as defined above with respect to the various example embodiments of the fifth aspect.

In an sixth aspect, the present invention provides polymers according to any of the first through fifth aspects, wherein $R^1$ and $R^3$ are as defined below with respect to the sixth aspect.

According to the sixth aspect, each $R^1$ is, independently, $R^6$—COOH, $R^6$—$SO_2H$, $R^6$—$SO_3H$, $R^6$—$PO_2H_2$, $R^6$—$PO_3H_2$, —P(O)(OR$^4$)$_2$, a $C_1$-$C_6$ alkyl, a $C_2$-$C_6$ alkenyl, a $C_2$-$C_6$ alkynyl, a $C_3$-$C_{10}$ cycloalkyl, a 5-10 atom heterocyclyl, a $C_6$-$C_{10}$ aryl, a 5-10 atom heteroaryl, a $C_1$-$C_6$ alkoxy, a $C_6$-$C_{10}$ aryloxy, a $C_1$-$C_6$ alkylthio, a $C_6$-$C_{10}$ arylthio, a $C_1$-$C_{10}$ sulfone, —(NR$^8$R$^9$)—, a halo, hydroxyl, —CN, nitro, or a $C_1$-$C_6$ acyl. In some embodiments, each $R^1$ is, independently, $R^6$—COOH, $R^6$—$SO_2H$, $R^6$—$SO_3H$, $R^6$—$PO_2H_2$, $R^6$—$PO_3H_2$, —P(O)(OR$^4$)$_2$, a $C_1$-$C_6$ alkyl, a $C_2$-$C_6$ alkenyl, a $C_2$-$C_6$ alkynyl, a $C_3$-$C_{10}$ cycloalkyl, a 5-10 atom heterocyclyl, a $C_6$-$C_{10}$ aryl, a 5-10 atom heteroaryl, a $C_1$-$C_6$ alkoxy, a $C_1$-$C_6$ alkylthio, a halo, —CN, or nitro. In some embodiments, each $R^1$ is, independently, —COOH, —$SO_2H$, —$SO_3H$, —$PO_3H_2$, —$PO_2H_2$, —$P(O)(OR^4)_2$, a $C_1$-$C_3$ alkyl, phenyl, a $C_1$-$C_3$ alkoxy, a $C_1$-$C_3$ alkylthio, a halo, —CN, or nitro. In some embodiments, each $R^1$ is, independently, —COOH, —$SO_2H$, —$SO_3H$, —$PO_3H_2$, —$PO_2H_2$, —$P(O)(OCH_2CH_3)_2$, methyl, trifluoromethyl, methoxy, methylthio, —CN, nitro, phenyl, or fluoro. In some embodiments, at least one instance of $R^1$ is —COOH, $SO_2H$, —$SO_3H$, —$PO_3H_2$, or —$PO_2H_2$. In some embodiments, at least one instance of $R^1$ is —$PO_3H_2$. In some embodiments, there is one instance of $R^1$ and $R^1$ is selected from —COOH, —$SO_2H$, —$SO_3H$, —$PO_3H_2$, or —$PO_2H_2$. In some embodiments, there is one instance of $R^1$ and $R^1$ is —COOH. In some embodiments, there is one instance of $R^1$ and $R^1$ is —$SO_2H$. In some embodiments, there is one instance of $R^1$ and $R^1$ is —$SO_3H$. In some embodiments, there is one instance of $R^1$ and $R^1$ is —$PO_3H_2$. In some embodiments, there is one instance of $R^1$ and $R^1$ is —$PO_2H_2$. The remainder of the variables are as defined below with respect to the various example embodiments of the sixth aspect.

According to the sixth aspect, each $R^3$ is, independently, $R^6$—COOH, $R^6$—$SO_2H$, $R^6$—$SO_3H$, $R^6$—$PO_2H_2$, $R^6$—$PO_3H_2$, —$P(O)(OR^4)_2$, a $C_1$-$C_6$ alkyl, a $C_2$-$C_6$ alkenyl, a $C_2$-$C_6$ alkynyl, a $C_3$-$C_{10}$ cycloalkyl, a 5-10 atom heterocyclyl, a $C_6$-$C_{10}$ aryl, a 5-10 atom heteroaryl, a $C_1$-$C_6$ alkoxy, a $C_6$-$C_{10}$ aryloxy, a $C_1$-$C_6$ alkylthio, a $C_6$-$C_{10}$ arylthio, a $C_1$-$C_{10}$ sulfone, —($NR^8R^9$)—, a halo, hydroxyl, —CN, nitro, or a $C_1$-$C_6$ acyl. In some embodiments, each $R^3$ is, independently, $R^6$—COOH, $R^6$—$SO_2H$, $R^6$—$SO_3H$, $R^6$—$PO_2H_2$, $R^6$—$PO_3H_2$, —$P(O)(OR^4)_2$, a $C_1$-$C_6$ alkyl, a $C_2$-$C_6$ alkenyl, a $C_2$-$C_6$ alkynyl, a $C_3$-$C_{10}$ cycloalkyl, a 5-10 atom heterocyclyl, a $C_6$-$C_{10}$ aryl, a 5-10 atom heteroaryl, a $C_1$-$C_6$ alkoxy, a $C_1$-$C_6$ alkylthio, a halo, —CN, or nitro. In some embodiments, each $R^3$ is, independently, —COOH, —$SO_2H$, —$SO_3H$, —$PO_3H_2$, —$PO_2H_2$, —$P(O)(OR^4)_2$, a $C_1$-$C_3$ alkyl, phenyl, a $C_1$-$C_3$ alkoxy, a $C_1$-$C_3$ alkylthio, a halo, —CN, or nitro. In some embodiments, each $R^3$ is, independently, —COOH, —$SO_2H$, —$SO_3H$, —$PO_3H_2$, —$PO_2H_2$, —$P(O)(OCH_2CH_3)_2$, methyl, trifluoromethyl, methoxy, methylthio, —CN, nitro, phenyl, or fluoro. The remainder of the variables are as defined above with respect to the various example embodiments of the sixth aspect.

In a seventh aspect, the present invention provides polymers according to any of the first through sixth aspects, wherein $R^1$ and $R^3$ are as defined below with respect to the seventh aspect.

According to the seventh aspect, each $R^1$ is, independently, $R^6$—COOH, $R^6$—$SO_2H$, $R^6$—$SO_3H$, $R^6$—$PO_2H_2$, $R^6$—$PO_3H_2$, —$P(O)(OR^4)_2$, a $C_1$-$C_6$ alkyl, a $C_2$-$C_6$ alkenyl, a $C_2$-$C_6$ alkynyl, a $C_3$-$C_{10}$ cycloalkyl, a 5-10 atom heterocyclyl, a $C_6$-$C_{10}$ aryl, a 5-10 atom heteroaryl, a $C_1$-$C_6$ alkoxy, a $C_1$-$C_6$ alkylthio, a halo, —CN, or nitro. In some embodiments, each $R^1$ is, independently, —COOH, —$SO_2H$, —$SO_3H$, —$PO_3H_2$, —$PO_2H_2$, —$P(O)(OR^4)_2$, a $C_1$-$C_3$ alkyl, phenyl, a $C_1$-$C_3$ alkoxy, a $C_1$-$C_3$ alkylthio, a halo, —CN, or nitro. In some embodiments, each $R^1$ is, independently, —COOH, —$SO_2H$, —$SO_3H$, 13 $PO_3H_2$, —$PO_2H_2$, —$P(O)(OCH_2CH_3)_2$, methyl, trifluoromethyl, methoxy, methylthio, —CN, nitro, phenyl, or fluoro. In some embodiments, at least one instance of $R^1$ is —COOH, $SO_2H$, —$SO_3H$, —$PO_3H_2$, or —$PO_2H_2$. In some embodiments, at least one instance of $R^1$ is —$PO_3H_2$. In some embodiments, there is one instance of $R^1$ and $R^1$ is selected from —COOH, —$SO_2H$, —$SO_3H$, —$PO_3H_2$, or —$PO_2H_2$. In some embodiments, there is one instance of $R^1$ and $R^1$ is —COOH. In some embodiments, there is one instance of $R^1$ and $R^1$ is —$SO_2H$. In some embodiments, there is one instance of $R^1$ and $R^1$ is —$SO_3H$. In some embodiments, there is one instance of $R^1$ and $R^1$ is —$PO_3H_2$. In some embodiments, there is one instance of $R^1$ and $R^1$ is —$PO_2H_2$. The remainder of the variables are as defined below with respect to the various example embodiments of the seventh aspect.

According to the seventh aspect, each $R^3$ is, independently, $R^6$—COOH, $R^6$—$SO_2H$, $R^6$—$SO_3H$, $R^6$—$PO_2H_2$, $R^6$—$PO_3H_2$, —$P(O)(OR^4)_2$, a $C_1$-$C_6$ alkyl, a $C_2$-$C_6$ alkenyl, a $C_2$-$C_6$ alkynyl, a $C_3$-$C_{10}$ cycloalkyl, a 5-10 atom heterocyclyl, a $C_6$-$C_{10}$ aryl, a 5-10 atom heteroaryl, a $C_1$-$C_6$ alkoxy, a $C_1$-$C_6$ alkylthio, a halo, —CN, or nitro. In some embodiments, each $R^3$ is, independently, —COOH, —$SO_2H$, —$SO_3H$, —$PO_3H_2$, —$PO_2H_2$, —$P(O)(OR^4)_2$, a $C_1$-$C_3$ alkyl, phenyl, a $C_1$-$C_3$ alkoxy, a $C_1$-$C_3$ alkylthio, a halo, —CN, or nitro. In some embodiments, each $R^3$ is, independently, —COOH, —$SO_2H$, —$SO_3H$, —$PO_3H_2$, —$PO_2H_2$, —$P(O)(OCH_2CH_3)_2$, methyl, trifluoromethyl, methoxy, methylthio, —CN, nitro, phenyl, or fluoro. The remainder of the variables are as defined above with respect to the various example embodiments of the seventh aspect.

In a eighth aspect, the present invention provides polymers according to any of the first through seventh aspects, wherein $R^1$ and $R^3$ are as defined below with respect to the eighth aspect.

According to the eighth aspect, each $R^1$ is, independently, —COOH, —$SO_2H$, —$SO_3H$, —$PO_3H_2$, —$PO_2H_2$, —$P(O)(OR^4)_2$, a $C_1$-$C_3$ alkyl, phenyl, a $C_1$-$C_3$ alkoxy, a $C_1$-$C_3$ alkylthio, a halo, —CN, or nitro. In some embodiments, each $R^1$ is, independently, —COOH, —$SO_2H$, —$SO_3H$, —$PO_3H_2$, —$PO_2H_2$, —$P(O)(OCH_2CH_3)_2$, methyl, trifluoromethyl, methoxy, methylthio, —CN, nitro, phenyl, or fluoro. In some embodiments, at least one instance of $R^1$ is —COOH, $SO_2H$, —$SO_3H$, —$PO_3H_2$, or —$PO_2H_2$. In some embodiments, at least one instance of $R^1$ is —$PO_3H_2$. In some embodiments, there is one instance of $R^1$ and $R^1$ is selected from —COOH, —$SO_2H$, —$SO_3H$, —$PO_3H_2$, or —$PO_2H_2$. In some embodiments, there is one instance of $R^1$ and $R^1$ is —COOH. In some embodiments, there is one instance of $R^1$ and $R^1$ is —$SO_2H$. In some embodiments, there is one instance of $R^1$ and $R^1$ is —$SO_3H$. In some embodiments, there is one instance of $R^1$ and $R^1$ is —$PO_3H_2$. In some embodiments, there is one instance of $R^1$ and $R^1$ is —$PO_2H_2$. The remainder of the variables are as defined below with respect to the various example embodiments of the eighth aspect.

According to the eighth aspect, each $R^3$ is, independently, —COOH, —$SO_2H$, —$SO_3H$, —$PO_3H_2$, —$PO_2H_2$, —$P(O)(OR^4)_2$, a $C_1$-$C_3$ alkyl, phenyl, a $C_1$-$C_3$ alkoxy, a $C_1$-$C_3$ alkylthio, a halo, —CN, or nitro. In some embodiments, each $R^3$ is, independently, —COOH, —$SO_2H$, —$SO_3H$, —$PO_3H_2$, —$PO_2H_2$, —$P(O)(OCH_2CH_3)_2$, methyl, trifluoromethyl, methoxy, methylthio, —CN, nitro, phenyl, or fluoro. The remainder of the variables are as defined above with respect to the various example embodiments of the eighth aspect.

In an ninth aspect, the present invention provides polymers according to any of the first through eighth aspects, wherein $R^1$ and $R^3$ are as defined below with respect to the ninth aspect.

According to the ninth aspect, each $R^1$ is, independently, —COOH, —$SO_2H$, —$SO_3H$, —$PO_3H_2$, —$PO_2H_2$, —$P(O)(OCH_2CH_3)_2$, methyl, trifluoromethyl, methoxy, methylthio, —CN, nitro, phenyl, or fluoro. In some embodiments, at least one instance of $R^1$ is —COOH, $SO_2H$, —$SO_3H$, —$PO_3H_2$, or —$PO_2H_2$. In some embodiments, at least one instance of $R^1$ is —$PO_3H_2$. In some embodiments, there is one instance of $R^1$ and $R^1$ is selected from —COOH, —SO$_2$H, —SO$_3$H, —PO$_3$H$_2$, or —PO$_2$H$_2$. In some embodiments, there is one instance of $R^1$ and $R^1$ is —COOH. In some embodiments, there is one instance of $R^1$ and $R^1$ is —SO$_2$H. In some embodiments, there is one instance of $R^1$ and $R^1$ is —SO$_3$H. In some embodiments, there is one instance of $R^1$ and $R^1$ is —PO$_3$H$_2$. In some embodiments, there is one instance of $R^1$ and $R^1$ is —PO$_2$H$_2$. The remainder of the variables are as defined below with respect to the various example embodiments of the ninth aspect.

According to the ninth aspect, each $R^3$ is, independently, —COOH, —SO$_2$H, —SO$_3$H, —PO$_3$H$_2$, —PO$_2$H$_2$, —P(O)(OCH$_2$CH$_3$)$_2$, methyl, trifluoromethyl, methoxy, methylthio, —CN, nitro, phenyl, or fluoro. The remainder of the variables are as defined above with respect to the various example embodiments of the ninth aspect.

In a tenth aspect, the present invention provides polymers according to any of the first or fifth aspects, wherein $R^2$ is $R^6$—COOH, $R^6$—SO$_2$H, $R^6$—SO$_3$H, $R^6$—PO$_2$H$_2$, $R^6$—PO$_3$H$_2$, P(O)(OR$^4$)$_2$, a C$_1$-C$_6$ alkyl, a C$_2$-C$_6$ alkenyl, a C$_2$-C$_6$ alkynyl, a C$_3$-C$_{10}$ cycloalkyl, a 5-10 atom heterocyclyl, a C$_6$-C$_{10}$ aryl, a 5-10 atom heteroaryl, a C$_1$-C$_6$ alkoxy, a C$_1$-C$_6$ alkylthio, a halo, hydroxyl, —CN, nitro, or a C$_1$-C$_6$ acyl. In some embodiments, $R^2$ is —COOH, —SO$_2$H, —SO$_3$H, —PO$_3$H$_2$, —PO$_2$H$_2$, —P(O)(OR$^4$)$_2$, a C$_1$-C$_3$ alkyl, phenyl, a C$_1$-C$_3$ alkoxy, a C$_1$-C$_3$ alkylthio, a halo, —CN, or nitro. In some embodiments, $R^2$ is —COOH, —SO$_2$H, —SO$_3$H, —PO$_3$H$_2$, —PO$_2$H$_2$, —P(O)(OCH$_2$CH$_3$)$_2$, methyl, trifluoromethyl, methoxy, methylthio, —CN, nitro, phenyl, or fluoro. In some embodiments, $R^2$ is $R^6$—COOH, $R^6$—SO$_2$H, $R^6$—SO$_3$H, $R^6$—PO$_2$H$_2$, $R^6$—PO$_3$H$_2$, P(O)(OR$^4$)$_2$, a C$_1$-C$_6$ alkyl, a C$_2$-C$_6$ alkenyl, a C$_2$—C$_6$ alkynyl, a C$_3$-C$_{10}$ cycloalkyl, a 5-10 atom heterocyclyl, a C$_6$-C$_{10}$ aryl, a 5-10 atom heteroaryl, a C$_1$-C$_6$ alkoxy, a C$_1$-C$_6$ alkylthio, a halo, hydroxyl, nitro, or a C$_1$-C$_6$ acyl. In some embodiments, $R^2$ is —COOH, —SO$_2$H, —SO$_3$H, —PO$_3$H$_2$, —PO$_2$H$_2$, —P(O)(OR$^4$)$_2$, a C$_1$-C$_3$ alkyl, phenyl, a C$_1$-C$_3$ alkoxy, a C$_1$-C$_3$ alkylthio, a halo, or nitro. In some embodiments, $R^2$ is —COOH, —SO$_2$H, —SO$_3$H, —PO$_3$H$_2$, —PO$_2$H$_2$, —P(O)(OCH$_2$CH$_3$)$_2$, methyl, trifluoromethyl, methoxy, methylthio, nitro, phenyl, or fluoro.

In a eleventh aspect, the present invention provides polymers according to any of the first, fifth, or tenth aspects, wherein $R^2$ is —COOH, —SO$_2$H, —SO$_3$H, —PO$_3$H$_2$, —PO$_2$H$_2$, —P(O)(OR$^4$)$_2$, a C$_1$-C$_3$ alkyl, phenyl, a C$_1$-C$_3$ alkoxy, a C$_1$-C$_3$ alkylthio, a halo, —CN, or nitro. In some embodiments, $R^2$ is —COOH, —SO$_2$H, —SO$_3$H, —PO$_3$H$_2$, —PO$_2$H$_2$, —P(O)(OCH$_2$CH$_3$)$_2$, methyl, trifluoromethyl, methoxy, methylthio, —CN, nitro, phenyl, or fluoro. In some embodiments, $R^2$ is —COOH, —SO$_2$H, —SO$_3$H, —PO$_3$H$_2$, —PO$_2$H$_2$, —P(O)(OR$^4$)$_2$, a C$_1$-C$_3$ alkyl, phenyl, a C$_1$-C$_3$ alkoxy, a C$_1$-C$_3$ alkylthio, a halo, or nitro. In some embodiments, $R^2$ is —COOH, —SO$_2$H, —SO$_3$H, —PO$_3$H$_2$, —PO$_2$H$_2$, —P(O)(OCH$_2$CH$_3$)$_2$, methyl, trifluoromethyl, methoxy, methylthio, nitro, phenyl, or fluoro.

In a twelfth aspect, the present invention provides polymers according to any of the first, fifth, tenth, or eleventh aspects, wherein $R^2$ is —COOH, —SO$_2$H, —SO$_3$H, —PO$_3$H$_2$, —PO$_2$H$_2$, —P(O)(OCH$_2$CH$_3$)$_2$, methyl, trifluoromethyl, methoxy, methylthio, —CN, nitro, phenyl, or fluoro. In some embodiments, $R^2$ is —COOH, —SO$_2$H, —SO$_3$H, —PO$_3$H$_2$, —PO$_2$H$_2$, —P(O)(OCH$_2$CH$_3$)$_2$, methyl, trifluoromethyl, methoxy, methylthio, nitro, phenyl, or fluoro.

In a thirteenth aspect, the present invention provides polymers according to any of the first through twelfth aspects, wherein at least one instance of $R^1$ is —COOH, —SO$_2$H, —SO$_3$H, —PO$_3$H$_2$, or —PO$_2$H$_2$. In some embodiments, at least one instance of $R^1$ is —PO$_3$H$_2$.

In a fourteenth aspect, the present invention provides polymers according to any of the first, second, or thirteenth aspects, wherein the repeat unit represented is represented by the following structural formula:

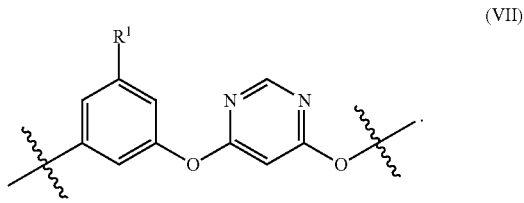

(VII)

According to the fourteenth aspect, $R^1$ is selected from $R^6$—COOH, $R^6$—SO$_2$H, $R^6$—SO$_3$H, $R^6$—PO$_2$H$_2$, $R^6$—PO$_3$H$_2$, —P(O)(OR$^4$)$_2$, —S(O$_2$)(OR$^5$), a C$_1$-C$_{20}$ alkyl, a C$_2$-C$_{20}$ alkenyl, a C$_2$-C$_{20}$ alkynyl, a C$_3$-C$_{20}$ cycloalkyl, a 5-20 atom heterocyclyl, a C$_6$-C$_{20}$ aryl, a 5-20 atom heteroaryl, a C$_1$-C$_{20}$ alkoxy, a C$_6$-C$_{20}$ aryloxy, a C$_1$-C$_{20}$ alkylthio, a C$_6$-C$_{20}$ arylthio, a C$_1$-C$_{20}$ sulfone, —(NR$^8$R$^9$)—, a halo, hydroxyl, —CN, nitro, or a C$_1$-C$_{20}$ acyl. In some embodiments, $R^1$ is, $R^6$—COOH, $R^6$—SO$_2$H, $R^6$—SO$_3$H, $R^6$—PO$_2$H$_2$, $R^6$—PO$_3$H$_2$, —P(O)(OR$^4$)$_2$, a C$_1$-C$_6$ alkyl, a C$_2$-C$_6$ alkenyl, a C$_2$-C$_6$ alkynyl, a C$_3$-C$_{10}$ cycloalkyl, a 5-10 atom heterocyclyl, a C$_6$-C$_{10}$ aryl, a 5-10 atom heteroaryl, a C$_1$-C$_6$ alkoxy, a C$_6$-C$_{10}$ aryloxy, a C$_1$-C$_6$ alkylthio, a C$_6$-C$_{10}$ arylthio, a C$_1$-C$_{10}$ sulfone, —(NR$^8$R$^9$)—, a halo, hydroxyl, —CN, nitro, or a C$_1$-C$_6$ acyl. In some embodiments, $R^1$ is $R^6$—COOH, $R^6$—SO$_2$H, $R^6$—SO$_3$H, $R^6$—PO$_2$H$_2$, $R^6$—PO$_3$H$_2$, —P(O)(OR$^4$)$_2$, a C$_1$-C$_6$ alkyl, a C$_2$-C$_6$ alkenyl, a C$_2$-C$_6$ alkynyl, a C$_3$-C$_{10}$ cycloalkyl, a 5-10 atom heterocyclyl, a C$_6$-C$_{10}$ aryl, a 5-10 atom heteroaryl, a C$_1$-C$_6$ alkoxy, a C$_1$-C$_6$ alkylthio, a halo, —CN, or nitro. In some embodiments, $R^1$ is —COOH, —SO$_2$H, —SO$_3$H, —PO$_3$H$_2$, —PO$_2$H$_2$, —P(O)(OR$^4$)$_2$, a C$_1$-C$_3$ alkyl, phenyl, a C$_1$-C$_3$ alkoxy, a C$_1$-C$_3$ alkylthio, a halo, —CN, or nitro. In some embodiments, $R^1$ is —COOH, —SO$_2$H, —SO$_3$H, —PO$_3$H$_2$, —PO$_2$H$_2$, —P(O)(OCH$_2$CH$_3$)$_2$, methyl, trifluoromethyl, methoxy, methylthio, —CN, nitro, phenyl, or fluoro. In some embodiments, $R^1$ is —COOH, SO$_2$H, —SO$_3$H, —PO$_3$H$_2$ or —PO$_2$H$_2$. In some embodiments, $R^1$ is —COOH. In some embodiments, $R^1$ is —SO$_2$H. In some embodiments, $R^1$ is —SO$_3$H. In some embodiments, $R^1$ is —PO$_3$H$_2$. In some embodiments, $R^1$ is —PO$_3$H$_2$. In some embodiments, $R^1$ is —PO$_2$H$_2$.

In a fifteenth aspect, the present invention provides polymers according to any of the first through fourteenth aspects, wherein at least one instance of $R^1$ is —PO$_3$H$_2$.

In an sixteenth aspect, the present invention provides polymers according to any of the first through fifteenth aspects, wherein only one instance of $R^1$, $R^2$, or $R^3$ is —COOH, SO$_2$H, —SO$_3$H, PO$_3$H$_2$ or —PO$_2$H$_2$.

In a seventeenth aspect, the present invention provides polymers according to any of the first through sixteenth aspects, wherein the polymers are a homopolymer.

In a eighteenth aspect, the present invention provides polymers according to any of the first through sixteenth aspects, wherein the polymers are copolymers. In some embodiments, the polymers are block copolymers. In some embodiments, the polymers are alternating copolymers.

In a nineteenth aspect, the present invention provides polymers according to any of the first through seventeenth aspects, wherein the polymers are homopolymers having a repeat unit according to any one of the structural formulas depicted below:

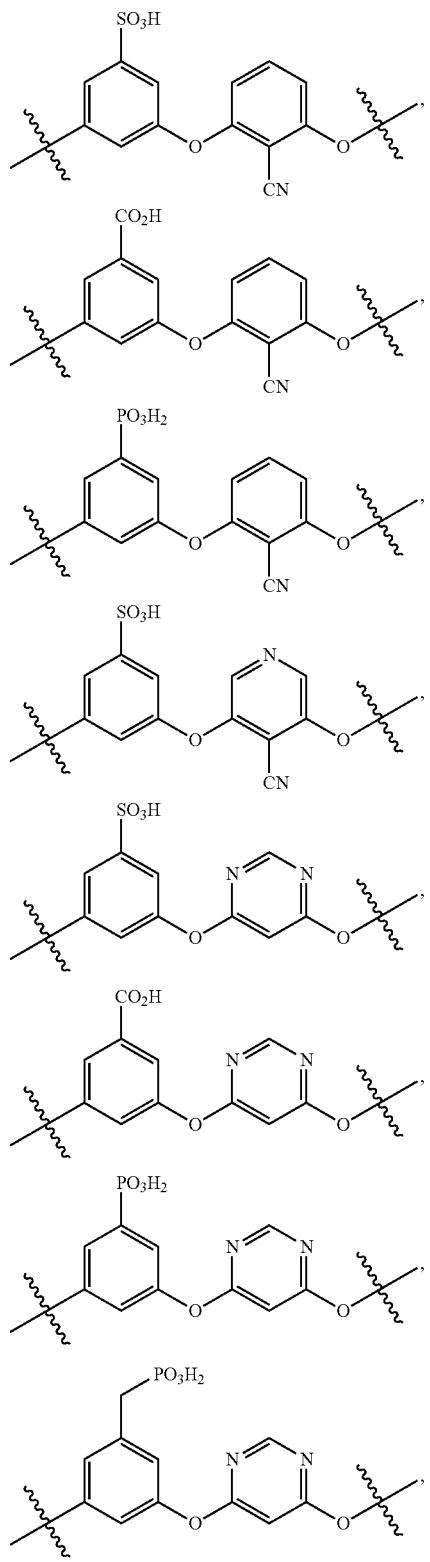

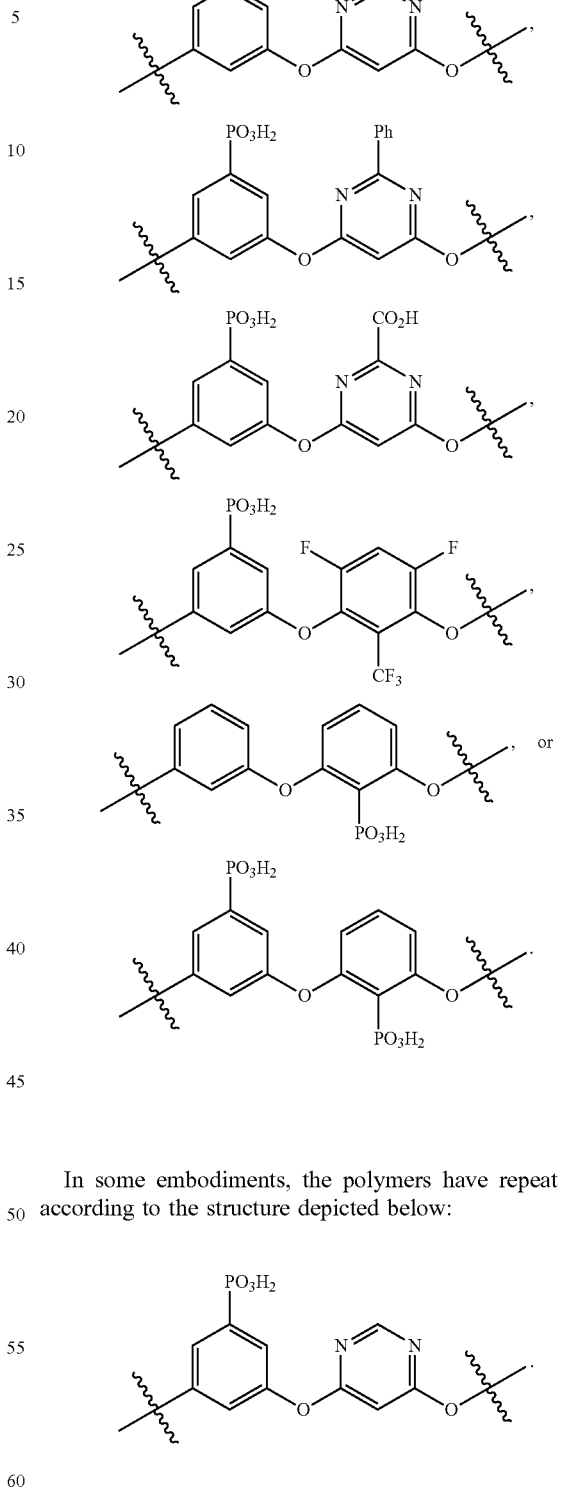

In some embodiments, the polymers have repeat units according to the structure depicted below:

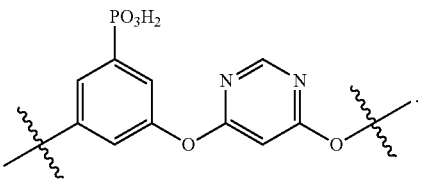

In a twentieth aspect, the present invention provides polymers according to any of the first through seventeenth or nineteenth aspects, wherein the polymers have repeat units according to the structure depicted below:

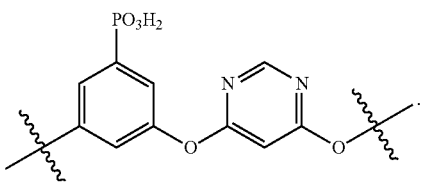

In a twenty-first aspect, the present invention provides ion conducting membranes comprising the polymers described in any of the first through twentieth aspects. In certain embodiments, the ion conducting membrane is a fuel cell membrane.

In a twenty-second aspect, the present invention provides fuel cells comprising the ion-conducting membrane described in the twenty-first aspect.

In a twenty-third aspect, the present invention provides poly(meta phenylene oxide) polymers including a plurality of aromatic residues.

In some embodiments of the twenty-third aspect, the polymers are functionalized with an acidic functional group bound directly to one or more of the plurality of aromatic residues. In some embodiments of the twenty-third aspect, the polymers are functionalized with an acidic functional group bound via a spacer to one or more of the plurality of aromatic residues. In some embodiments, the acidic functional group is phosphonic acid, sulfuric acid, or carboxylic acid.

In some embodiments of the twenty-third aspect, the polymers are functionalized with a basic functional group. In some embodiments, the basic functional group is a pyrimidine or a pyridine.

In some embodiments of the twenty-third aspect, the polymers are functionalized with a pendant aromatic group, such as a phenyl group.

In some embodiments of the twenty-third aspect, the polymers are functionalized with an alkyl group, such as a methyl group.

In some embodiments of the twenty-third aspect, the polymers are functionalized with an alkyl group containing one or more fluorine atoms, such as a trifluoromethyl group.

In some embodiments of the twenty-third aspect, the polymers are functionalized with a nitrile.

In some embodiments of the twenty-third aspect, the polymers are functionalized with one or more fluorine atoms on one or more of the aromatic residues.

In some embodiments of the twenty-third aspect, the polymers are functionalized with the same acid group or a group yielding the same acid group upon post-polymerization modification on consecutive monomers. In some embodiments, the polymers are functionalized with different acid groups or groups yielding the same acid group upon post-polymerization modification on alternating monomers.

In some embodiments of the twenty-third aspect, the polymers are alternately functionalized on consecutive monomers. In some embodiments, the polymers are alternately functionalized with an acid and a base on consecutive monomers.

In some embodiments of the twenty-third aspect, the polymers are used in forming an ion-conducting membrane Definitions Unless otherwise defined herein, scientific and technical terms used in this application shall have the meanings that are commonly understood by those of ordinary skill in the art. Generally, nomenclature used in connection with, and techniques of, chemistry described herein, are those well-known and commonly used in the art.

The term "acyl" is art-recognized and refers to a group represented by the general formula hydrocarbylC(O)—, preferably alkylC(O)—.

The term "acylamino" is art-recognized and refers to an amino group substituted with an acyl group and may be represented, for example, by the formula hydrocarbylC(O)NH—.

The term "acyloxy" is art-recognized and refers to a group represented by the general formula hydrocarbylC(O)O—, preferably alkylC(O)O—.

The term "alkoxy" refers to an alkyl group, having an oxygen attached thereto. Representative alkoxy groups include methoxy, trifluoromethoxy, ethoxy, propoxy, tert-butoxy and the like.

The term "alkoxyalkyl" refers to an alkyl group substituted with an alkoxy group and may be represented by the general formula alkyl-O-alkyl.

The term "alkenyl", as used herein, refers to an aliphatic group containing at least one double bond and is intended to include both "unsubstituted alkenyls" and "substituted alkenyls", the latter of which refers to alkenyl moieties having substituents replacing a hydrogen on one or more carbons of the alkenyl group. Typically, a straight chained or branched alkenyl group has from 1 to about 20 carbon atoms, preferably from 1 to about 10 unless otherwise defined. Such substituents may occur on one or more carbons that are included or not included in one or more double bonds. Moreover, such substituents include all those contemplated for alkyl groups, as discussed below, except where stability is prohibitive. For example, substitution of alkenyl groups by one or more alkyl, carbocyclyl, aryl, heterocyclyl, or heteroaryl groups is contemplated.

An "alkyl" group or "alkane" is a straight chained or branched non-aromatic hydrocarbon which is completely saturated. Typically, a straight chained or branched alkyl group has from 1 to about 20 carbon atoms, preferably from 1 to about 10 unless otherwise defined. Examples of straight chained and branched alkyl groups include methyl, ethyl, n-propyl, iso-propyl, n-butyl, sec-butyl, tert-butyl, pentyl, hexyl, pentyl and octyl.

Moreover, the term "alkyl" as used throughout the specification, examples, and claims is intended to include both "unsubstituted alkyls" and "substituted alkyls", the latter of which refers to alkyl moieties having substituents replacing a hydrogen on one or more substitutable carbons of the hydrocarbon backbone. Such substituents, if not otherwise specified, can include, for example, a halogen (e.g., fluoro), a hydroxyl, a carbonyl (such as a carboxyl, an alkoxycarbonyl, a formyl, or an acyl), a thiocarbonyl (such as a thioester, a thioacetate, or a thioformate), an alkoxy, a phosphoryl, a phosphate, a phosphonate, a phosphinate, an amino, an amido, an amidine, an imine, a cyano, a nitro, an azido, a sulfhydryl, an alkylthio, a sulfate, a sulfonate, a sulfamoyl, a sulfonamido, a sulfonyl, a heterocyclyl, an aralkyl, or an aromatic or heteroaromatic moiety. In preferred embodiments, the substituents on substituted alkyls are selected from $C_{1-6}$ alkyl, $C_{3-6}$ cycloalkyl, halogen, carbonyl, cyano, or hydroxyl. In more preferred embodiments, the substituents on substituted alkyls are selected from fluoro, carbonyl, cyano, or hydroxyl. It will be understood by those skilled in the art that the moieties substituted on the hydrocarbon chain can themselves be substituted, if appropriate. For instance, the substituents of a substituted alkyl may include substituted and unsubstituted forms of amino, azido, imino, amido, phosphoryl (including phosphonate and phosphinate), sulfonyl (including sulfate, sulfonamido, sulfamoyl and sulfonate), and silyl groups, as well as ethers, alkylthios, carbonyls (including ketones, aldehydes, carboxylates, and esters), —CF$_3$, —CN and the like. Exemplary substituted alkyls are described below. Cycloalkyls can be further substituted with alkyls, alkenyls, alkoxys, alkylthios, aminoalkyls, carbonyl-substituted alkyls, —CF$_3$, —CN, and the like.

The term "C$_{x-y}$" when used in conjunction with a chemical moiety, such as, acyl, acyloxy, alkyl, alkenyl, alkynyl, or alkoxy is meant to include groups that contain from x to y carbons in the chain. For example, the term "C$_{x-y}$ alkyl" refers to substituted or unsubstituted saturated hydrocarbon groups, including straight-chain alkyl and branched-chain alkyl groups that contain from x to y carbons in the chain, including haloalkyl groups. Preferred haloalkyl groups include trifluoromethyl, difluoromethyl, 2,2,2-trifluoroethyl, and pentafluoroethyl. C$_0$ alkyl indicates a hydrogen where the group is in a terminal position, a bond if internal. The terms "C$_{2-y}$ alkenyl" and "C$_{2-y}$ alkynyl" refer to substituted or unsubstituted unsaturated aliphatic groups analogous in length and possible substitution to the alkyls described above, but that contain at least one double or triple bond respectively.

The term "alkylamino", as used herein, refers to an amino group substituted with at least one alkyl group.

The term "alkylthio", as used herein, refers to a thiol group substituted with an alkyl group and may be represented by the general formula alkylS—.

The term "arylthio", as used herein, refers to a thiol group substituted with an alkyl group and may be represented by the general formula arylS—.

The term "alkynyl", as used herein, refers to an aliphatic group containing at least one triple bond and is intended to include both "unsubstituted alkynyls" and "substituted alkynyls", the latter of which refers to alkynyl moieties having substituents replacing a hydrogen on one or more carbons of the alkynyl group. Typically, a straight chained or branched alkynyl group has from 1 to about 20 carbon atoms, preferably from 1 to about 10 unless otherwise defined. Such substituents may occur on one or more carbons that are included or not included in one or more triple bonds. Moreover, such substituents include all those contemplated for alkyl groups, as discussed above, except where stability is prohibitive. For example, substitution of alkynyl groups by one or more alkyl, carbocyclyl, aryl, heterocyclyl, or heteroaryl groups is contemplated.

The term "amide", as used herein, refers to a group

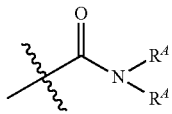

wherein each R$^A$ independently represent a hydrogen or hydrocarbyl group, or two R$^A$ are taken together with the N atom to which they are attached complete a heterocycle having from 4 to 8 atoms in the ring structure.

The terms "amine" and "amino" are art-recognized and refer to both unsubstituted and substituted amines and salts thereof, e.g., a moiety that can be represented by

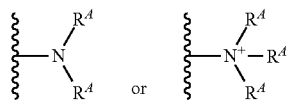

wherein each R$^A$ independently represents a hydrogen or a hydrocarbyl group, or two R$^A$ are taken together with the N atom to which they are attached complete a heterocycle having from 4 to 8 atoms in the ring structure.

The term "aminoalkyl", as used herein, refers to an alkyl group substituted with an amino group.

The term "aralkyl", as used herein, refers to an alkyl group substituted with an aryl group.

The term "aryl" as used herein include substituted or unsubstituted single-ring aromatic groups in which each atom of the ring is carbon. Preferably the ring is a 6- or 20-membered ring, more preferably a 6-membered ring. The term "aryl" also includes polycyclic ring systems having two or more cyclic rings in which two or more carbons are common to two adjoining rings wherein at least one of the rings is aromatic, e.g., the other cyclic rings can be cycloalkyls, cycloalkenyls, cycloalkynyls, aryls, heteroaryls, and/or heterocyclyls. Aryl groups include benzene, naphthalene, phenanthrene, phenol, aniline, and the like.

The term "carbamate" is art-recognized and refers to a group

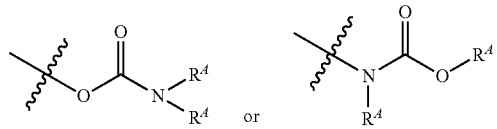

wherein each R$^A$ independently represent hydrogen or a hydrocarbyl group, such as an alkyl group, or both R$^A$ taken together with the intervening atom(s) complete a heterocycle having from 4 to 8 atoms in the ring structure.

The terms "carbocycle", and "carbocyclic", as used herein, refers to a saturated or unsaturated ring in which each atom of the ring is carbon. Preferably, a carbocylic group has from 3 to 20 carbon atoms. The term carbocycle includes both aromatic carbocycles and non-aromatic carbocycles. Non-aromatic carbocycles include both cycloalkane rings, in which all carbon atoms are saturated, and cycloalkene rings, which contain at least one double bond. "Carbocycle" includes 5-7 membered monocyclic and 8-12 membered bicyclic rings. Each ring of a bicyclic carbocycle may be selected from saturated, unsaturated and aromatic rings. Carbocycle includes bicyclic molecules in which one, two or three or more atoms are shared between the two rings. The term "fused carbocycle" refers to a bicyclic carbocycle in which each of the rings shares two adjacent atoms with the other ring. Each ring of a fused carbocycle may be selected from saturated, unsaturated and aromatic rings. In an exemplary embodiment, an aromatic ring, e.g., phenyl, may be fused to a saturated or unsaturated ring, e.g., cyclohexane, cyclopentane, or cyclohexene. Any combination of saturated, unsaturated and aromatic bicyclic rings, as valence permits, is included in the definition of carbocyclic. Exemplary "carbocycles" include cyclopentane, cyclohexane, bicyclo[2.2.1]heptane, 1,5-cyclooctadiene, 1,2,3,4-tetrahydronaphthalene, bicyclo[4.2.0]oct-3-ene, naphthalene and adamantane. Exemplary fused carbocycles include decalin, naphthalene, 1,2,3,4-tetrahydronaphthalene, bicyclo[4.2.0]

octane, 4,5,6,7-tetrahydro-1H-indene and bicyclo[4.1.0]hept-3-ene. "Carbocycles" may be susbstituted at any one or more positions capable of bearing a hydrogen atom.

A "cycloalkyl" group is a cyclic hydrocarbon which is completely saturated. "Cycloalkyl" includes monocyclic and bicyclic rings. Preferably, a cycloalkyl group has from 3 to 20 carbon atoms. Typically, a monocyclic cycloalkyl group has from 3 to about 10 carbon atoms, more typically 3 to 8 carbon atoms unless otherwise defined. The second ring of a bicyclic cycloalkyl may be selected from saturated, unsaturated and aromatic rings. Cycloalkyl includes bicyclic molecules in which one, two or three or more atoms are shared between the two rings. The term "fused cycloalkyl" refers to a bicyclic cycloalkyl in which each of the rings shares two adjacent atoms with the other ring. The second ring of a fused bicyclic cycloalkyl may be selected from saturated, unsaturated and aromatic rings. A "cycloalkenyl" group is a cyclic hydrocarbon containing one or more double bonds.

The term "carbocyclylalkyl", as used herein, refers to an alkyl group substituted with a carbocycle group.

The term "carbonate", as used herein, refers to a group —OCO$_2$—R$^A$, wherein R$^A$ represents a hydrocarbyl group.

The term "carboxy", as used herein, refers to a group represented by the formula —CO$_2$H.

The term "ester", as used herein, refers to a group —C(O)OR$^A$ wherein R$^A$ represents a hydrocarbyl group.

The term "ether", as used herein, refers to a hydrocarbyl group linked through an oxygen to another hydrocarbyl group. Accordingly, an ether substituent of a hydrocarbyl group may be hydrocarbyl-O—. Ethers may be either symmetrical or unsymmetrical. Examples of ethers include, but are not limited to, heterocycle-O-heterocycle and aryl-O-heterocycle. Ethers include "alkoxyalkyl" groups, which may be represented by the general formula alkyl-O-alkyl.

The terms "halo" and "halogen" as used herein means halogen and includes chloro, fluoro, bromo, and iodo.

The terms "hetaralkyl" and "heteroaralkyl", as used herein, refers to an alkyl group substituted with a hetaryl group.

The term "heteroalkyl", as used herein, refers to a saturated or unsaturated chain of carbon atoms and at least one heteroatom, wherein no two heteroatoms are adjacent.

The terms "heteroaryl" and "hetaryl" include substituted or unsubstituted aromatic single ring structures, preferably 5- to 20-membered rings, more preferably 5- to 6-membered rings, whose ring structures include at least one heteroatom, preferably one to four heteroatoms, more preferably one or two heteroatoms. The terms "heteroaryl" and "hetaryl" also include polycyclic ring systems having two or more cyclic rings in which two or more carbons are common to two adjoining rings wherein at least one of the rings is heteroaromatic, e.g., the other cyclic rings can be cycloalkyls, cycloalkenyls, cycloalkynyls, aryls, heteroaryls, and/or heterocyclyls. Heteroaryl groups include, for example, pyrrole, furan, thiophene, imidazole, oxazole, thiazole, pyrazole, pyridine, pyrazine, pyridazine, and pyrimidine, and the like.

The term "heteroatom" as used herein means an atom of any element other than carbon or hydrogen. Preferred heteroatoms are nitrogen, oxygen, and sulfur.

The terms "heterocyclyl", "heterocycle", and "heterocyclic" refer to substituted or unsubstituted non-aromatic ring structures, preferably 3- to 20-membered rings, more preferably 3- to 7-membered rings, whose ring structures include at least one heteroatom, preferably one to four heteroatoms, more preferably one or two heteroatoms. The terms "heterocyclyl" and "heterocyclic" also include polycyclic ring systems having two or more cyclic rings in which two or more carbons are common to two adjoining rings wherein at least one of the rings is heterocyclic, e.g., the other cyclic rings can be cycloalkyls, cycloalkenyls, cycloalkynyls, aryls, heteroaryls, and/or heterocyclyls. Heterocyclyl groups include, for example, piperidine, piperazine, pyrrolidine, morpholine, lactones, lactams, and the like.

The term "heterocyclylalkyl", as used herein, refers to an alkyl group substituted with a heterocycle group.

The term "hydrocarbyl", as used herein, refers to a group that is bonded through a carbon atom, wherein that carbon atom does not have a =O or =S substituent. Hydrocarbyls may optionally include heteroatoms. Hydrocarbyl groups include, but are not limited to, alkyl, alkenyl, alkynyl, alkoxyalkyl, aminoalkyl, aralkyl, aryl, aralkyl, carbocyclyl, cycloalkyl, carbocyclylalkyl, heteroalkyl, heteroaryl groups bonded through a carbon atom, heterocyclyl groups bonded through a carbon atom, heterocyclylakyl, or hydroxyalkyl. Thus, groups like methyl, ethoxyethyl, 2-pyridyl, and trifluoromethyl are hydrocarbyl groups, but substituents such as acetyl (which has a =O substituent on the linking carbon) and ethoxy (which is linked through oxygen, not carbon) are not.

The term "hydroxyalkyl", as used herein, refers to an alkyl group substituted with a hydroxy group.

The term "lower" when used in conjunction with a chemical moiety, such as, acyl, acyloxy, alkyl, alkenyl, alkynyl, or alkoxy is meant to include groups where there are six or fewer non-hydrogen atoms in the substituent. A "lower alkyl", for example, refers to an alkyl group that contains six or fewer carbon atoms. In certain embodiments, acyl, acyloxy, alkyl, alkenyl, alkynyl, or alkoxy substituents defined herein are respectively lower acyl, lower acyloxy, lower alkyl, lower alkenyl, lower alkynyl, or lower alkoxy, whether they appear alone or in combination with other substituents, such as in the recitations hydroxyalkyl and aralkyl (in which case, for example, the atoms within the aryl group are not counted when counting the carbon atoms in the alkyl substituent).

The terms "polycyclyl", "polycycle", and "polycyclic" refer to two or more rings (e.g., cycloalkyls, cycloalkenyls, cycloalkynyls, aryls, heteroaryls, and/or heterocyclyls) in which two or more atoms are common to two adjoining rings, e.g., the rings are "fused rings". Each of the rings of the polycycle can be substituted or unsubstituted. In certain embodiments, each ring of the polycycle contains from 3 to 10 atoms in the ring, preferably from 5 to 7.

In the phrase "poly(meta-phenylene oxides)", the term "phenylene" refers inclusively to 6-membered aryl or 6-membered heteroaryl moieties. Exemplary poly(metaphenylene oxides) are described in the first through twentieth aspects of the present disclosure.

The term "silyl" refers to a silicon moiety with three hydrocarbyl moieties attached thereto.

The term "substituted" refers to moieties having substituents replacing a hydrogen on one or more carbons of the backbone. It will be understood that "substitution" or "substituted with" includes the implicit proviso that such substitution is in accordance with permitted valence of the substituted atom and the substituent, and that the substitution results in a stable compound, e.g., which does not spontaneously undergo transformation such as by rearrangement, cyclization, elimination, etc. Moieties that may be substituted can include any appropriate substituents described herein, for example, acyl, acylamino, acyloxy, alkoxy, alkoxyalkyl, alkenyl, alkyl, alkylamino, alkylthio, arylthio, alkynyl, amide, amino, aminoalkyl, aralkyl, carbamate, carbocyclyl, cycloalkyl, carbocyclylalkyl, carbonate, ester, ether, heteroaralkyl, heterocyclyl, heterocyclylalkyl, hydrocarbyl, silyl, sulfone, or thioether. As used herein, the term "substituted" is contemplated to include all permissible substituents of organic compounds. In a broad aspect, the permissible substituents include acyclic and cyclic, branched and unbranched, carbocyclic and heterocyclic, aromatic and non-aromatic substituents of organic compounds. The permissible substituents can be one or more and the same or different for appropriate organic compounds. For purposes of this invention, the heteroatoms such as nitrogen may have hydrogen substituents and/or any permissible substituents of organic compounds described herein which satisfy the valences of the heteroatoms. Substituents can include any substituents described herein, for example, a halogen, a hydroxyl, a carbonyl (such as a carboxyl, an alkoxycarbonyl, a formyl, or an acyl), a thiocarbonyl (such as a thioester, a thioacetate, or a thioformate), an alkoxy, a phosphoryl, a phosphate, a phosphonate, a phosphinate, an amino, an amido, an amidine, an imine, a cyano, a nitro, an azido, a sulfhydryl, an alkylthio, a sulfate, a sulfonate, a sulfamoyl, a sulfonamido, a sulfonyl, a heterocyclyl, an aralkyl, or an aromatic or heteroaromatic moiety. In preferred embodiments, the substituents on substituted alkyls are selected from $C_{1-6}$ alkyl, $C_{3-6}$ cycloalkyl, halogen, carbonyl, cyano, or hydroxyl. In more preferred embodiments, the substituents on substituted alkyls are selected from fluoro, carbonyl, cyano, or hydroxyl. It will be understood by those skilled in the art that substituents can themselves be substituted, if appropriate. Unless specifically stated as "unsubstituted," references to chemical moieties herein are understood to include substituted variants. For example, reference to an "aryl" group or moiety implicitly includes both substituted and unsubstituted variants.

The term "sulfonate" is art-recognized and refers to the group $SO_3H$, or a pharmaceutically acceptable salt thereof.

The term "sulfone" is art-recognized and refers to the group $—S(O)_2—R^A$, wherein $R^A$ represents a hydrocarbyl.

The term "thioether", as used herein, is equivalent to an ether, wherein the oxygen is replaced with a sulfur.

EXAMPLES

The invention now being generally described, it will be more readily understood by reference to the following examples which are included merely for purposes of illustration of certain aspects and embodiments of the present invention, and are not intended to limit the invention.

Example 1

General Procedures

The polymers disclosed herein may be prepared via double $S_NAr$ between a 1,3-dihalide electrophile and a nucleophilic 1,3-diphenol (for instance, the reaction depicted in Scheme 2).

Scheme 2

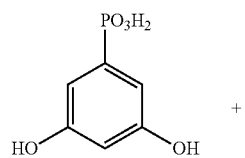

+

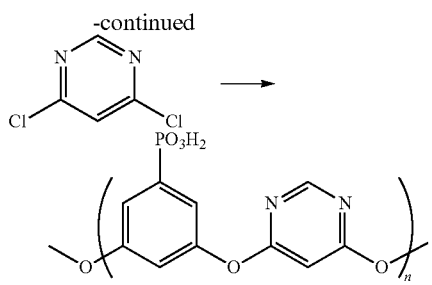

The polymerization is tolerant of a variety of functional groups on both the electrophilic and nucleophilic monomers.

Various protogenic groups may be incorporated into these polymers to allow proton transport through them. The $S_NAr$ polymerization technique allows precise control over functional group identity and location, as well as the possibility to alternate functional groups down the length of the backbone. Since many other polymerization techniques are incompatible with protogenic moieties such as sulfuric, phosphonic, and carboxylic acids or other hydrogen bonding functionalities, these groups are often added in later steps, yielding incompletely and irregularly functionalized polymers.

Sulfuric, phosphonic, and carboxylic acid groups have varying effects on the proton conductivity of otherwise identical polymer backbones. Loading of protogenic groups may be varied from 50% of residues (i.e., at least one protogenic group on every other residue) to 100% (i.e., at least one protogenic group on each residue).

Example 2

Preparation of m-diphenols (10)

3,5-dihydroxybenzenesulfonic acid (10a): Under an ambient atmosphere in a 50 mL round bottom flask charged with a magnetic stir bar were combined benzene-1,3,5-triol (1 gram, 7.9 mmol), $NaS_2O_5$ (5.82 grams, 35 mmol), and distilled water (7.75 ml). The reaction was refluxed for 48 hours. The solution was diluted with ethanol, allowed to stand overnight and filtered. The product was recovered in a 94% yield.

3,5-dihydroxybenzoic acid (10b): purchased from Acros Organics (97%) and used with no further purification.

(3,5-dihydroxyphenyl)phosphonic acid (10c): Into a standard 30 mL microwave vial charged with a magnetic stir bar were added: 1-bromo-3,5-dimethoxybenzene (12.0 mmol, 2.62 g), triethylphosphite (14.4 mmol, 2.6 mL), $NiCl_2$ (1.2 mmol, 154 mg). The vial was irradiated in a CEM discover microwave reactor at 160° C. for 2 hours. After completion of the reaction, the crude product was purified by silica gel flash column chromatography (eluent: step gradient of 3% to 9% MeOH in $CH_2Cl_2$) to afford diethyl (3,5-dimethoxyphenyl)phosphonate in a 84% isolated yield. Refluxing in concentrated HBr for 24 hours, followed by neutralization with $K_2CO_3$ afforded the (3,5-dihydroxyphenyl)phosphonic acid in a quantitative yield. Removal of water under a reduced pressure provided the (3,5-dihydroxyphenyl)phosphonic acid along with various reaction salts (which were not considered a hindrance to the subsequent polymerization, so were not further separated from the desired product—but they were thoroughly mixed to ensure homogeneity). The percent mass of desired 10c in the 10c/salts mixture was determined by NMR spectroscopy with an internal standard.

(3,5-dihydroxybenzyl)phosphonic acid (10d): Into a standard 30 mL microwave vial charged with a magnetic stir bar were added: 1-(bromomethyl)-3,5-dimethoxybenzene (17.5 mmol, 4.04 g), and triethyl phosphite (17.5 mmol, 3.0 mL). The vial was irradiated in a CEM discover microwave reactor at 160° C. for 2 hours. After completion of the reaction, the crude product was purified by silica gel flash column chromatography (eluent: step gradient of 3% to 9% MeOH in $CH_2Cl_2$) to afford diethyl (3,5-dimethoxybenzyl)phosphonate in a 93% isolated yield. Refluxing in concentrated HBr for 24 hours, followed by neutralization with $K_2CO_3$ afforded the (3,5-dihydroxybenzyl)phosphonic acid (10d) in a quantitative yield. Removal of water under a reduced pressure provided the (3,5-dihydroxyphenyl)phosphonic acid along with various reaction salts (which were not considered a hindrance to the subsequent polymerization, so were not further separated from the desired product—but they were thoroughly mixed to ensure homogeneity). The percent mass of desired 10d in the 10d/salts mixture was determined by NMR spectroscopy with an internal standard.

Resorcinol (10e): purchased from Sigma Aldrich and used with no further purification.

Example 3

Preparation of aryl m-dihalide (11)

2,6-difluorobenzonitrile (11a): purchased from Acros Organics (97%) and used with no further purification.

3,5-dichloro-4-pyrimidinecarbonitrile (11b): purchased from Sigma Aldrich (97%) and used with no further purification.

4,6-dichloropyrimidine (11c): purchased from Sigma Aldrich (97%) and used with no further purification.

4,6-dichloro-2-methylpyrimidine (11d): purchased from TCI (98%) and used with no further purification.

Fenchlorim (11e): purchased from Toronto Research Chemicals and used with no further purification.

4,6-dichloropyrimidine-2-carboxylic acid (11f) purchased from Sigma Aldrich and used with no further purification.

2,3,5,6-tetrafluorobenzotrifluoride (11g): purchased from Oakwood Chemicals and used with no further purification.

Diethyl (2,6-difluorophenyl)phosphonate (11f): Into a standard 30 mL microwave vial charged with a magnetic stir bar were added: 2-bromo-1,3-difluorobenzene (18 mmol, 3.8 g), triethylphosphite (21.6 mmol, 3.9 mL), $NiCl_2$ (1.6 mmol, 200 mg). The vial was irradiated in a CEM discover microwave reactor at 160° C. for 2 hours. After completion of the reaction, the crude product was purified by silica gel flash column chromatography (eluent: step gradient of 3% to 9% MeOH in $CH_2Cl_2$) to afford diethyl (3,5-dimethoxyphenyl)phosphonate in a 84% isolated yield.

Example 4

Synthesis of poly(mPO)s

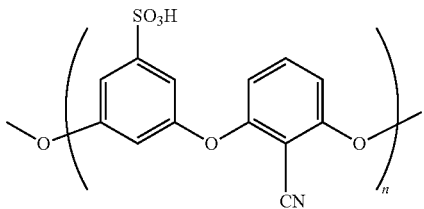

12a

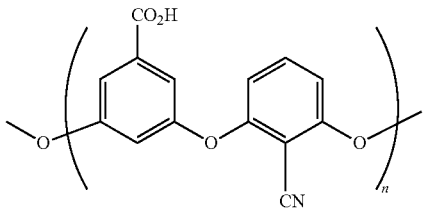

12b

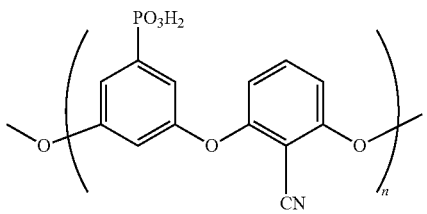

12c

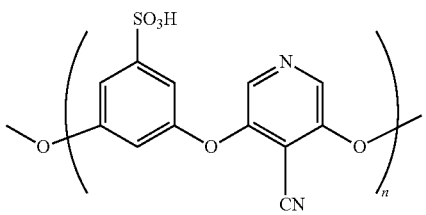

12d

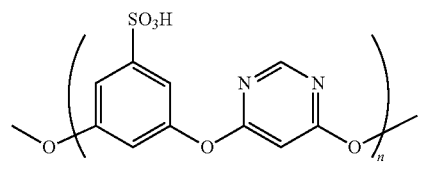

12e

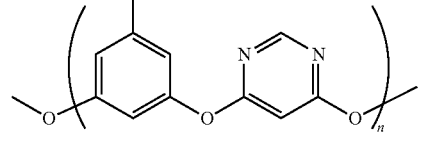

12f

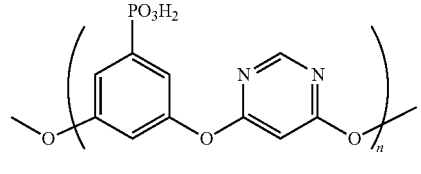

12g

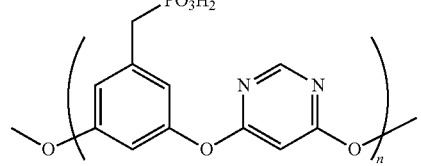

12h

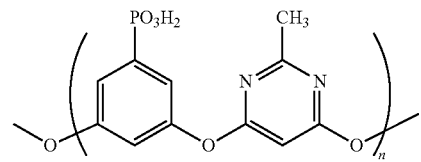

12i

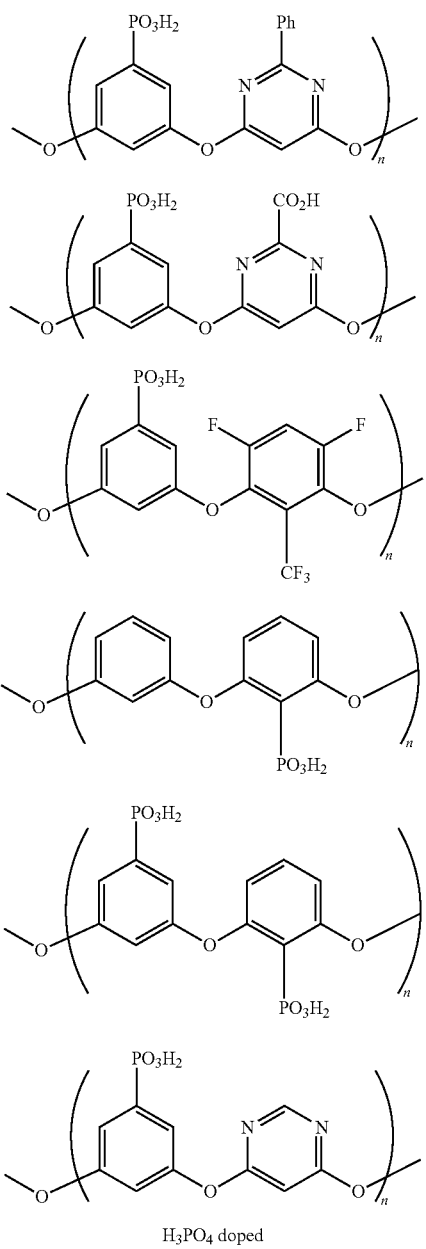

Polymers 12a-12o were synthesized as follows. Under an inert atmosphere, 1.35 mmol of the appropriate m-diphenol 10 (1 equiv), 1.35 mmol of the appropriate aryl m-dihalide 11 (1 equiv), and anhydrous DMSO (2.0 mL) were combined. Upon reaching solution homogeneity, 2 g of freshly, finely ground anhydrous $K_2CO_3$ (10 equiv) was added, and the flask was immediately placed in an oil bath at 100° C. The reaction was stirred vigorously and quenched after 40-120 minutes by first adding additional DMSO (8 mL) and then precipitating the polymer 1M HCl. If the polymer did not precipitate, the water would be removed under reduced pressure and the polymer precipitated from the DMSO solution with a mixture of ethyl acetate, toluene and ethanol. In order to separate the polymers from smaller oligomers and reaction salts, the crude reaction product was purified via size exclusion chromatography (BioRad, biogel P10 media) with an eluent of either distilled water, a mixture of THF (up to 20%) in water, or a pH 9.4 buffer solution.

TABLE 1

Exemplary reaction conditions for polymer synthesis.

| polymer | aryl m-dihalide | m-diphenols | reaction time |
|---|---|---|---|
| 12a | 11a | 10a | 120 min |
| 12b | 11a | 10b | 120 min |
| 12c | 11a | 10c | 120 min |
| 12d | 11b | 10a | 120 min |
| 12e | 11c | 10a | 120 min |
| 12f | 11c | 10b | 120 min |
| 12g | 11c | 10c | 120 min |
| 12h | 11c | 10d | 60 min |
| 12i | 11d | 10c | 120 min |
| 12j | 11e | 10c | 120 min |
| 12k | 11f | 10c | 120 min |
| 12l | 11g | 10c | 120 min |
| 12m[a] | 11f | 10e | 40 min |
| 12n[a] | 11f | 10c | 120 min |

[a] after polymerization, the diethyl phosphonate from the 11f monomer was cleaved by refluxing the resultant polymer in 37% HCl for 12 hours.

The molecular weight distributions of certain polymers prepared according to the above procedure are listed in Table 2.

TABLE 2

Polymer molecular weight distributions

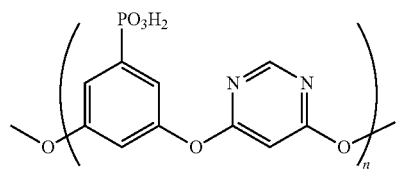

12e

Mp: 397949
Mn: 386734
Mw: 591497
Mz: 970891
PD: 1.5295

12f

Mp: 11032
Mn: 9223
Mw: 9844
Mz: 10329
PD: 1.0673

12g

Mp: 24697
Mn: 26880
Mw: 28788
Mz: 31175
PD: 1.071

TABLE 2-continued

Polymer molecular weight distributions

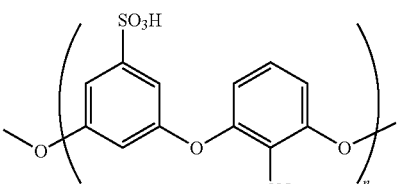

12a

Mp: 14490
Mn: 17861
Mw: 19737
Mz: 22063
PD: 1.105

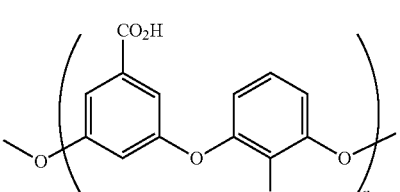

12b

Mp: 48868
Mn: 34775
Mw: 38167
Mz: 41572
PD: 1.0975

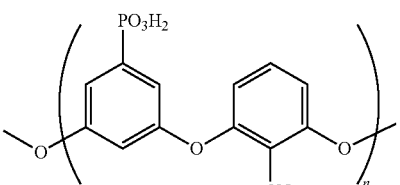

12c

Mp: 6393
Mn: 5906
Mw: 6689
Mz: 7525
PD: 1.1326

Example 5

Conductivity Measurements

The conductivity of the polymers synthesized in Example 4 was measured as follows. Films of each polymer were cast onto a stainless steel electrode through a hole punched in capacitive polyimide tape, which was ultimately sandwiched by a second electrode. The electrode assemblies were subjected to electronic impedance spectroscopy (EIS) in a temperature and humidity controlled oven operating from 30-140° C. at 85% relative humidity. The results are provided in Table 3.

TABLE 3

Conductivity Measurements

| polymer | $Scm^{-1}$ |
|---|---|
| 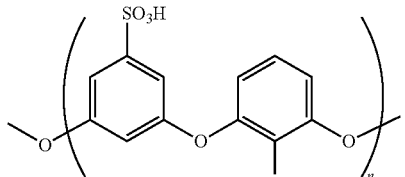 12a | $8.9 \times 10^{-5}$ [a] <br> $6.4 \times 10^{-4}$ [b] <br> $5.4 \times 10^{-4}$ [c] <br> $1.6 \times 10^{-6}$ [d] <br> $7.1 \times 10^{-6}$ [e] <br> $2.4 \times 10^{-8}$ [f] |
| 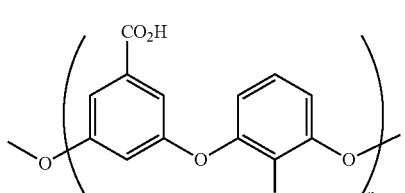 12b | $4.8 \times 10^{-6}$ [a] <br> $2.4 \times 10^{-5}$ [b] <br> $6.6 \times 10^{-5}$ [c] <br> $3.2 \times 10^{-5}$ [d] <br> $5.9 \times 10^{-5}$ [e] <br> $7.9 \times 10^{-5}$ [f] |
| 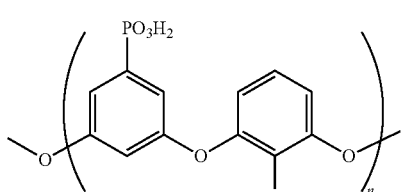 12c | $5.7 \times 10^{-6}$ [a] <br> $1.5 \times 10^{-5}$ [b] <br> $3.8 \times 10^{-5}$ [c] <br> $4.1 \times 10^{-4}$ [d] <br> $5.6 \times 10^{-3}$ [e] <br> $4.4 \times 10^{-4}$ [f] |
| 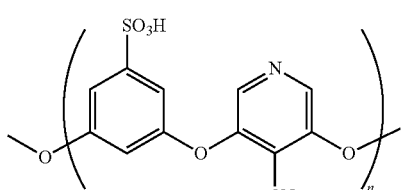 12d | $2.8 \times 10^{-5}$ [a] <br> $1.9 \times 10^{-4}$ [b] <br> $3.4 \times 10^{-4}$ [c] <br> $5.6 \times 10^{-5}$ [d] <br> $6.1 \times 10^{-6}$ [e] <br> $3.1 \times 10^{-8}$ [f] |
| 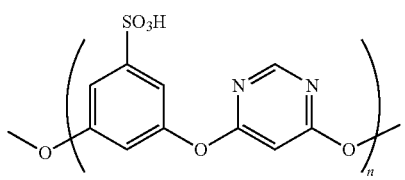 12e | $1.4 \times 10^{-5}$ [a] <br> $2.4 \times 10^{-5}$ [b] <br> $4.2 \times 10^{-5}$ [c] <br> $6.1 \times 10^{-9}$ [d] <br> $1.2 \times 10^{-7}$ [e] <br> $7.4 \times 10^{-10}$ [f] |
| 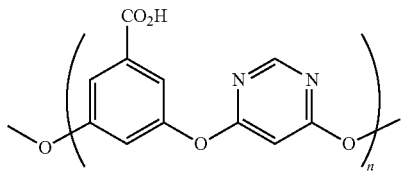 12f | $2.9 \times 10^{-6}$ [a] <br> $6.6 \times 10^{-6}$ [b] <br> $8.4 \times 10^{-6}$ [c] <br> $1.3 \times 10^{-5}$ [d] <br> $4.1 \times 10^{-5}$ [e] <br> $1.1 \times 10^{-4}$ [f] |

TABLE 3-continued

Conductivity Measurements

| polymer | Scm$^{-1}$ |
|---|---|
| 12g (aryl-PO$_3$H$_2$ / pyrimidine polymer) | 2.5 × 10$^{-6}$ $^a$<br>1.8 × 10$^{-5}$ $^b$<br>3.4 × 10$^{-5}$ $^c$<br>8.7 × 10$^{-4}$ $^d$<br>4.5 × 10$^{-2}$ $^e$<br>2.4 × 10$^{-3}$ $^f$ |
| 12h (benzyl-PO$_3$H$_2$ / pyrimidine polymer) | 3.4 × 10$^{-8}$ $^a$<br>5.9 × 10$^{-8}$ $^b$<br>2.2 × 10$^{-7}$ $^c$<br>6.7 × 10$^{-5}$ $^d$<br>3.5 × 10$^{-4}$ $^e$<br>6.4 × 10$^{-5}$ $^f$ |
| 12i (aryl-PO$_3$H$_2$ / 2-methyl-pyrimidine polymer) | 4.9 × 10$^{-6}$ $^a$<br>6.3 × 10$^{-6}$ $^b$<br>1.5 × 10$^{-5}$ $^c$<br>3.8 × 10$^{-5}$ $^d$<br>4.3 × 10$^{-4}$ $^e$<br>9.4 × 10$^{-9}$ $^f$ |
| 12j (aryl-PO$_3$H$_2$ / 2-phenyl-pyrimidine polymer) | 1.9 × 10$^{-6}$ $^a$<br>7.6 × 10$^{-5}$ $^b$<br>3.4 × 10$^{-5}$ $^c$<br>4.9 × 10$^{-5}$ $^d$<br>3.2 × 10$^{-4}$ $^e$<br>7.2 × 10$^{-9}$ $^f$ |
| 12k (aryl-PO$_3$H$_2$ / 2-carboxy-pyrimidine polymer) | 1.7 × 10$^{-6}$ $^a$<br>8.9 × 10$^{-6}$ $^b$<br>2.1 × 10$^{-5}$ $^c$<br>4.8 × 10$^{-5}$ $^d$<br>3.4 × 10$^{-4}$ $^e$<br>6.4 × 10$^{-4}$ $^f$ |
| 12l (aryl-PO$_3$H$_2$ / tetrafluoro-CF$_3$-arene polymer) | 9.5 × 10$^{-6}$ $^a$<br>2.3 × 10$^{-5}$ $^b$<br>4.8 × 10$^{-5}$ $^c$<br>7.4 × 10$^{-5}$ $^d$<br>1.6 × 10$^{-4}$ $^e$<br>4.2 × 10$^{-5}$ $^f$ |
| 12m (aryl / PO$_3$H$_2$-pyridine polymer) | 2.7 × 10$^{-7}$ $^a$<br>1.2 × 10$^{-6}$ $^b$<br>6.5 × 10$^{-6}$ $^c$<br>8.8 × 10$^{-5}$ $^d$<br>6.7 × 10$^{-4}$ $^e$<br>3.9 × 10$^{-5}$ $^f$ |
| 12n (bis-PO$_3$H$_2$ diaryl ether polymer) | 3.7 × 10$^{-6}$ $^a$<br>7.2 × 10$^{-6}$ $^b$<br>1.4 × 10$^{-5}$ $^c$<br>3.9 × 10$^{-5}$ $^d$<br>5.8 × 10$^{-4}$ $^e$<br>7.3 × 10$^{-6}$ $^f$ |
| 12o (aryl-PO$_3$H$_2$ / pyrimidine polymer, H$_3$PO$_4$ doped) | 7.8 × 10$^{-7}$ $^a$<br>6.4 × 10$^{-6}$ $^b$<br>1.9 × 10$^{-5}$ $^c$<br>5.3 × 10$^{-4}$ $^d$<br>3.8 × 10$^{-3}$ $^e$<br>5.7 × 10$^{-4}$ $^f$ |

Conditions: $^a$ 40° C., 85% RH, $^b$ 60° C., 85% RH, $^c$ 80° C., 85% RH, $^d$ 100° C., 85% RH, $^e$ 140° C., 85% RH, $^f$ 200° C., 0% RH Sulfonated polymers (12a and 12e) offer higher conductivities over their phosphonated (12c and 12g) or carboxylated (12b and 12f) analogues under hydrated conditions below 100° C. Above 100° C., and under anhydrous conditions, however, the phosphonated analogues provide the highest conductivities. The carboxylic acid functionalized polymers demonstrate conductivities intermediate between their sulfonated and carboxylated counterparts; their conductivities are not highly reliant on hydration, as with the sulfonated polymers, yet they are more capacitive than similar phosphonic acid functionalized polymers.

Alternating acid-base residues (12d-k) provided surprisingly high conductivities (12g: 4.5×10$^{-2}$ S/cm @ 140° C. and 95% RH) under a temperature regime close to optimum fuel cell operating conditions. Even under fully anhydrous conditions, this polymer performed extremely well (2.4× 10$^{-3}$ S/cm @ 200° C. and 0% RH).

Polymers with phosphonic acid groups and pyrimidine moieties on alternating residues were superior to those with phosphonic acid groups as the sole protogenic moiety. The ability to alternate acid-base residues highlights the utility of this polymerization technique, given a) the excellent conductivity of the aryl phosphonic acid/pyrimidine polymer 12g, and b) the fact that the basic nitrogens provide a handle for phosphoric acid doping (12o).

Example 6

Physical Properties

Figure 2:
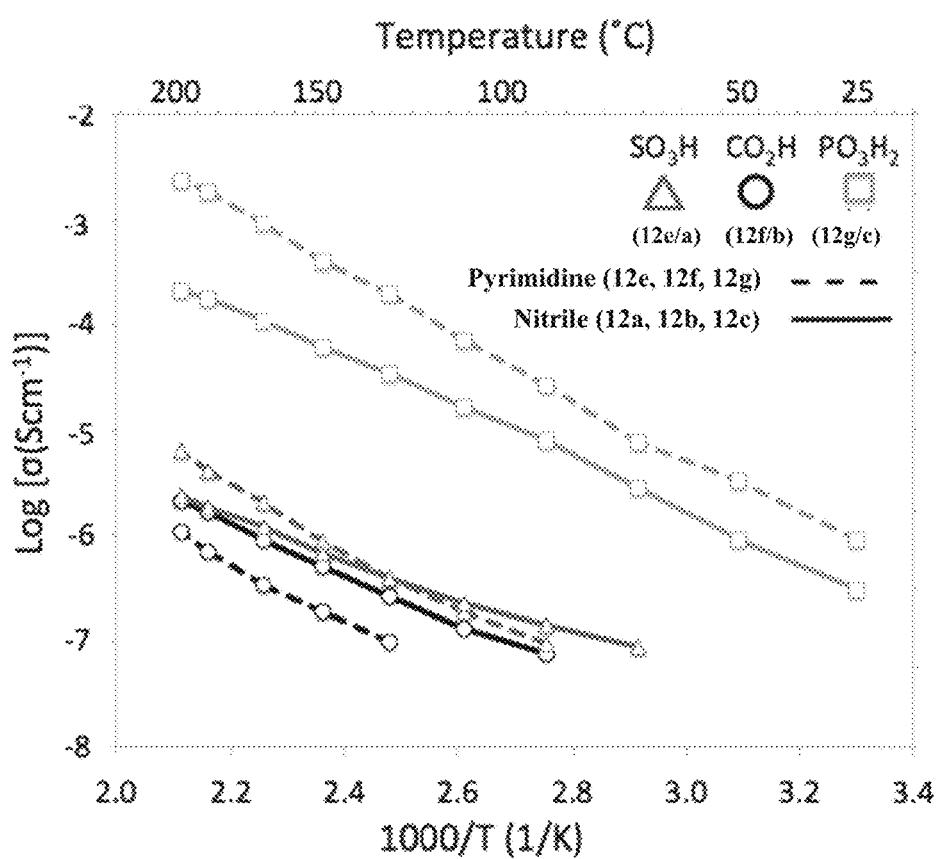
FIG. 2 is a graph showing the conductivity of example embodiments of polymers of the invention under vacuum as a function of temperature over the temperature range 30-200° C.

The physical properties of certain polymers are presented in Table 4. FIG. 1 plots their conductivities from 40-140° C. at 85% relative humidity. FIG. 2 plots their conductivities from 30-200° C. under vacuum.

TABLE 4

Physical properties of polymers.

| Polymer | Properties |
|---|---|
| 12e (SO$_3$H pyrimidine polymer) | M$_w$: 19497<br>T$_{d5\%}{}^a$: 304° C.<br>T$_{d5\%}{}^b$: 361° C.<br>T$_g$/T$_c$/T$_m$: 73/225/385° C. |
| 12a (SO$_3$H benzonitrile polymer) | M$_w$: 19737<br>T$_{d5\%}{}^a$: 384° C.<br>T$_{d5\%}{}^b$: 402° C.<br>T$_g$/T$_c$/T$_m$: 82/352/—° C. |
| 12f (CO$_2$H pyrimidine polymer) | M$_w$: 11032<br>T$_{d5\%}{}^a$: 204° C.<br>T$_{d5\%}{}^b$: 279° C.<br>T$_g$/T$_c$/T$_m$: 94/—/—° C. |
| 12b (CO$_2$H benzonitrile polymer) | M$_w$: 38167<br>T$_{d5\%}{}^a$: 291<br>T$_{d5\%}{}^b$: 382<br>T$_g$/T$_c$/T$_m$: 99/—/—° C. |
| 12g (PO$_3$H$_2$ pyrimidine polymer) | M$_w$: 31175<br>T$_{d5\%}{}^a$: 315° C.<br>T$_{d5\%}{}^b$: 445° C.<br>T$_g$/T$_c$/T$_m$: 88/295/—° C. |
| 12c (PO$_3$H$_2$ benzonitrile polymer) | M$_w$: 6689<br>T$_{d5\%}{}^a$: 313° C.<br>T$_{d5\%}{}^b$: 461° C.<br>T$_g$/T$_c$/T$_m$: 95/—/—° C. |

$^a$Determined by TGA in air. $^b$Determined by TGA in N$_2$.

Of these polymers 12a displayed the highest proton conductivity under conditions of high RH and under 80° C. (FIG. 1). Conductivity peaked at 6.4×10$^{-4}$ S/cm and then declined rapidly upon heating to 100° C. as hydration was lost. A similar conductivity pattern was observed for the pyrimidine-containing analogue 12e, although conductivities were consistently lower than the benzonitrile system 12a. At high temperature, both of the sulfonated polymers approached the conductivities displayed for anhydrous proton transport. Conductivities below 80° C. for phosphonated (12g and 12c) or carboxylated (12f and 12b) polymers were reduced relative to the sulfonated systems. However, unlike the sulfonated polymers, conductivity was not lost upon heating above 100° C. Instead, conductivities continued to increase modestly for carboxylic acid-functionalized polymers 12f and 12b and significantly for phosphonic acid-functionalized 12g and 12g over the temperature regime 100-140° C. eventually reaching 2.5×10$^{-2}$ S/cm for 12g at 140° C. and 85% RH. This is higher than nearly every reported phosphonated PEM and on par with the industry standard, nafion (1×10$^{-1}$ S/cm), but under a temperature regime closer to optimum fuel cell operating conditions (140° C. vs. 80° C.).

Conductivity under fully anhydrous conditions was similarly investigated in a vacuum desiccated high temperature oven (FIG. 2). Carboxylated systems slightly outperformed the sulfonated analogues. The phosphonic acid systems displayed dramatically higher anhydrous conductivities, and 12g (containing backbone pyrimidine rings) added approximately an order of magnitude to the proton conductivity over the entire temperature range (25-200° C.) compared to the benzonitrile system 12c.

Example 7

Post-polymerization Functionalization

Some of the polymers described herein may be prepared using post-polymerization functionalization steps. Many appropriate post-functionalization reactions are known to those of skill in the art. For example, post-polymerization functionalizations allow preparation of polymers with pendant aryl or nucleophilic groups.

Palladium-catalyzed cross coupling reactions (Liebskind-Srogl, scheme 1) may be used to couple aryl-boronic acids to pyrimidines to prepare polymers containing pendant aryl groups:

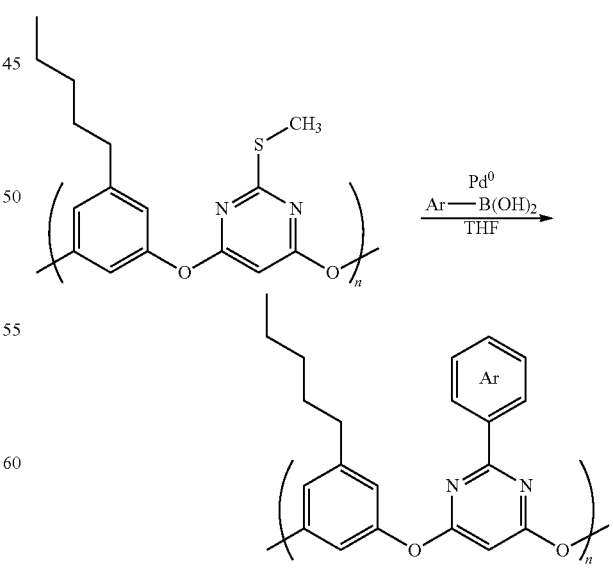

Palladium catalyzed coupling reactions may also be performed on iodo-functionalized polymers.

Another option is to oxidize pendant thioethers to sulfones, and, optionally, subsequent nucleophilic aromatic substitution. This reaction may be used, for example to add pendant amino groups, alkoxy groups, aryloxy groups, alkylthio groups, or arylthio groups.

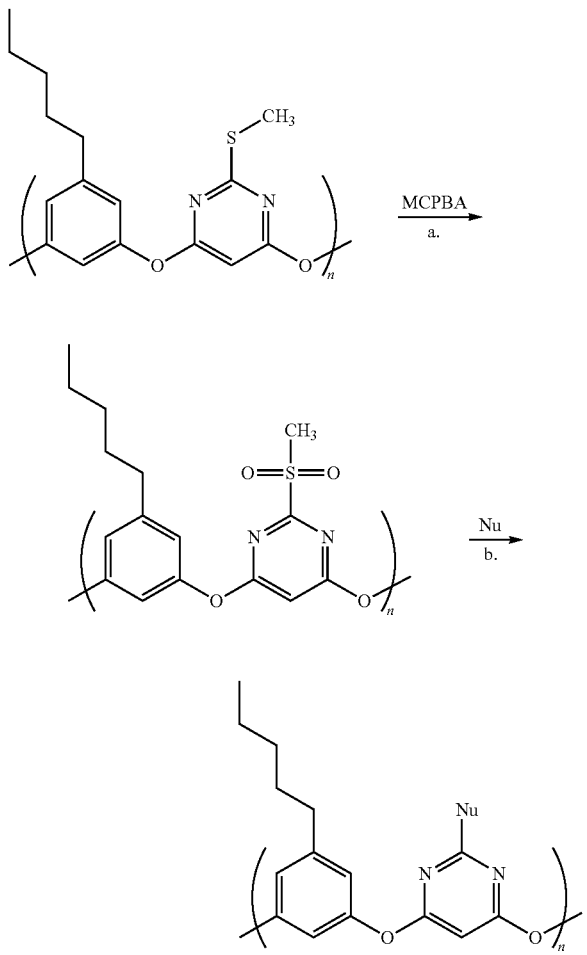

REFERENCES

All publications and patents mentioned herein are hereby incorporated by reference in their entirety as if each individual publication or patent was specifically and individually indicated to be incorporated by reference. In case of conflict, the present application, including any definitions herein, will control.

EQUIVALENTS

While specific embodiments of the subject invention have been discussed, the above specification is illustrative and not restrictive. Many variations of the invention will become apparent to those skilled in the art upon review of this specification and the claims below. The full scope of the invention should be determined by reference to the claims, along with their full scope of equivalents, and the specification, along with such variations.

The invention claimed is:

1. A polymer comprising at least one repeat unit represented by any one of structural formulas (IA)-(IE):

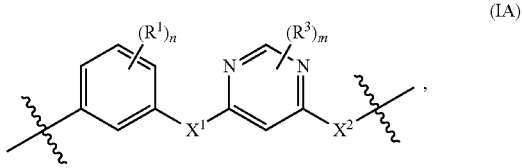
(IA)

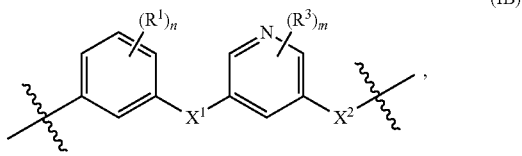
(IB)

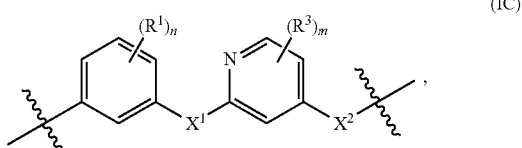
(IC)

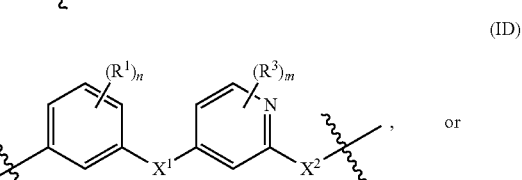
(ID), or

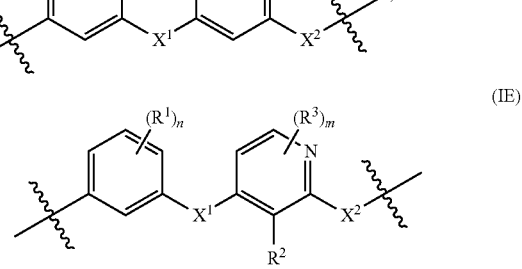
(IE)

wherein:
n is, for each occurrence independently, 0, 1, 2, 3, or 4;
m is, for each occurrence independently, 0, 1, 2, or 3;
$X^1$ and $X^2$ are, each independently, —O—, —S—, or —(NR$^7$)—;
each instance of $R^1$ is independently selected from $R^6$—COOH, $R^6$—SO$_2$H, $R^6$—SO$_3$H, $R^6$—PO$_2$H$_2$, $R^6$—PO$_3$H$_2$, —P(O)(OR$^4$)$_2$, —S(O$_2$)(OR$^5$), a $C_1$-$C_{20}$ alkyl, a $C_2$-$C_{20}$ alkenyl, a $C_2$-$C_{20}$ alkynyl, a $C_3$-$C_{20}$ cycloalkyl, a 5-20 atom heterocyclyl, a $C_6$-$C_{20}$ aryl, a 5-20 atom heteroaryl, a $C_1$-$C_{20}$ alkoxy, a $C_6$-$C_{20}$ aryloxy, a $C_1$-$C_{20}$ alkylthio, a $C_6$-$C_{20}$ arylthio, a $C_1$-$C_{20}$ sulfone, —(NR$^8$R$^9$)—, a halo, hydroxyl, —CN, nitro, or a $C_1$-$C_{20}$ acyl;
$R^2$ is $R^6$—COOH, $R^6$—SO$_2$H, $R^6$—SO$_3$H, $R^6$—PO$_2$H$_2$, $R^6$—PO$_3$H$_2$, —P(O)(OR$^4$)$_2$, —S(O$_2$)(OR$^5$), a $C_1$-$C_{20}$ alkyl, a $C_2$-$C_{20}$ alkenyl, a $C_2$-$C_{20}$ alkynyl, a $C_3$-$C_{20}$ cycloalkyl, a 5-20 atom heterocyclyl, a $C_6$-$C_{20}$ aryl, a 5-20 atom heteroaryl, a $C_1$-$C_{20}$ alkoxy, a $C_6$-$C_{20}$ aryloxy, a $C_1$-$C_{20}$ alkylthio, a $C_6$-$C_{20}$ arylthio, a $C_1$-$C_{20}$ sulfone, —(NR$^8$R$^9$)—, a halo, hydroxyl, —CN, nitro, or a $C_1$-$C_{20}$ acyl;
each instance of $R^3$ is independently selected from $R^6$—COOH, $R^6$—SO$_2$H, $R^6$—SO$_3$H, $R^6$—PO$_2$H$_2$, $R^6$—PO$_3$H$_2$, —P(O)(OR$^4$)$_2$, —S(O$_2$)(OR$^5$), a $C_1$-$C_{20}$ alkyl, a $C_2$-$C_{20}$ alkenyl, a $C_2$-$C_{20}$ alkynyl, a $C_3$-$C_{20}$ cycloalkyl, a 5-20 atom heterocyclyl, a $C_6$-$C_{20}$ aryl, a 5-20 atom heteroaryl, a $C_1$-$C_{20}$ alkoxy, a $C_6$-$C_{20}$ aryloxy, a $C_1$-$C_{20}$ alkylthio, a $C_6$-$C_{20}$ arylthio, a $C_1$-$C_{20}$ sulfone, —($NR^8R^9$)—, a halo, hydroxyl, —CN, nitro, or a $C_1$-$C_{20}$ acyl;

each $R^4$ is, independently, a $C_1$-$C_6$ alkyl, a $C_2$-$C_6$ alkenyl, a $C_2$-$C_6$ alkynyl, or a $C_3$-$C_6$ cycloalkyl;

each $R^5$ is, independently, a $C_1$-$C_6$ alkyl, a $C_2$-$C_6$ alkenyl, a $C_2$-$C_6$ alkynyl, or a $C_3$-$C_6$ cycloalkyl;

each $R^6$ is, independently, a single bond, a $C_1$-$C_6$ alkyl, a $C_2$-$C_6$ alkenyl, a $C_2$-$C_6$ alkynyl, a $C_1$-$C_6$ alkoxy, or a $C_3$-$C_6$ cycloalkyl;

each $R^7$, $R^8$, and $R^9$ is, independently, H, a $C_1$-$C_{20}$ alkyl, a $C_6$-$C_{20}$ aryl, a 5-20 atom heteroaryl, a $C_1$-$C_{20}$ acyl, or sulfonyl; and wherein $R^2$, at least one instance of $R^1$, or at least one instance of $R^3$ is $R^6$—COOH, $R^6$—$SO_2H$, $R^6$—$SO_3H$, $R^6$—$PO_2H_2$, or $R^6$—$PO_3H_2$; and wherein in formulas IA-ID, at least one of n and m is greater than 0.

2. The polymer of claim 1, wherein the repeat unit is represented by the following structural formula:

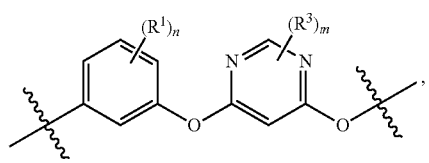

(II)

wherein:
n is 0, 1, 2, 3, or 4;
m is 0, 1, or 2; and
at least one of n and m is greater than 0.

3. The polymer of claim 1, wherein the repeat unit is represented by the following structural formula:

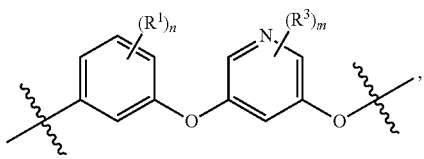

(III)

wherein:
n is 0, 1, 2, 3, or 4;
m is 0, 1, 2, or 3; and
at least one of n and m is greater than 0.

4. The polymer of claim 1, wherein the repeat unit is represented by the following structural formulas:

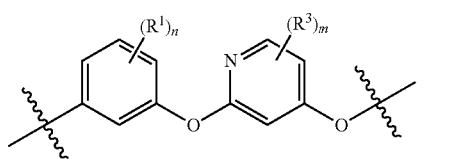

(IV)

or

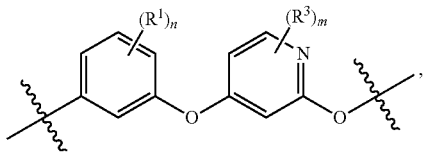

(V)

wherein:
n, for each occurrence independently, is 0, 1, 2, 3, or 4;
m, for each occurrence independently, is 0, 1, 2, or 3; and
in each of formulas (IV) and (V), at least one of n and m is greater than 0.

5. The polymer of claim 1, wherein the repeat unit is represented by the following structural formula:

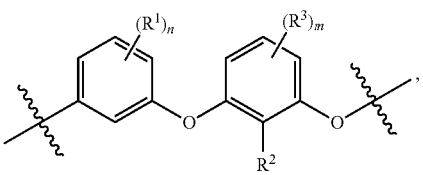

(VI)

wherein:
n is 0, 1, 2, 3, or 4; and
m is 0, 1, 2, or 3.

6. The polymer of claim 1, wherein:
each $R^1$ is, independently, $R^6$—COOH, $R^6$—$SO_2H$, $R^6$—$SO_3H$, $R^6$—$PO_2H_2$, $R^6$—$PO_3H_2$, —$P(O)(OR^4)_2$, a $C_1$-$C_6$ alkyl, a $C_2$-$C_6$ alkenyl, a $C_2$-$C_6$ alkynyl, a $C_3$-$C_{10}$ cycloalkyl, a 5-10 atom heterocyclyl, a $C_6$-$C_{10}$ aryl, a 5-10 atom heteroaryl, a $C_1$-$C_6$ alkoxy, a $C_6$-$C_{10}$ aryloxy, a $C_1$-$C_6$ alkylthio, a $C_6$-$C_{10}$ arylthio, a $C_1$-$C_{10}$ sulfone, —($NR^8R^9$)—, a halo, hydroxyl, —CN, nitro, or a $C_1$-$C_6$ acyl; and each $R^3$ is, independently, $R^6$—COOH, $R^6$—$SO_2H$, $R^6$—$SO_3H$, $R^6$—$PO_2H_2$, $R^6$—$PO_3H_2$, —$P(O)(OR^4)_2$, a $C_1$-$C_6$ alkyl, a $C_2$-$C_6$ alkenyl, a $C_2$-$C_6$ alkynyl, a $C_3$-$C_{10}$ cycloalkyl, a 5-10 atom heterocyclyl, a $C_6$-$C_{10}$ aryl, a 5-10 atom heteroaryl, a $C_1$-$C_6$ alkoxy, a $C_6$-$C_{10}$ aryloxy, a $C_1$-$C_6$ alkylthio, a $C_6$-$C_{10}$ arylthio, a $C_1$-$C_{10}$ sulfone, —($NR^8R^9$)—, a halo, hydroxyl, —CN, nitro, or a $C_1$-$C_6$ acyl.

7. The polymer of claim 6, wherein:
each $R^1$ is, independently, $R^6$—COOH, $R^6$—$SO_2H$, $R^6$—$SO_3H$, $R^6$—$PO_2H_2$, $R^6$—$PO_3H_2$, —$P(O)(OR^4)_2$, a $C_1$-$C_6$ alkyl, a $C_2$-$C_6$ alkenyl, a $C_2$-$C_6$ alkynyl, a $C_3$-$C_{10}$ cycloalkyl, a 5-10 atom heterocyclyl, a $C_6$-$C_{10}$ aryl, a 5-10 atom heteroaryl, a $C_1$-$C_6$ alkoxy, a $C_1$-$C_6$ alkylthio, a halo, —CN, or nitro; and each $R^3$ is, independently, $R^6$—COOH, $R^6$—$SO_2H$, $R^6$—$SO_3H$, $R^6$—$PO_2H_2$, $R^6$—$PO_3H_2$, —$P(O)(OR^4)_2$, a $C_1$-$C_6$ alkyl, a $C_2$-$C_6$ alkenyl, a $C_2$-$C_6$ alkynyl, a $C_3$-$C_{10}$ cycloalkyl, a 5-10 atom heterocyclyl, a $C_6$-$C_{10}$ aryl, a 5-10 atom heteroaryl, a $C_1$-$C_6$ alkoxy, a $C_1$-$C_6$ alkylthio, a halo, —CN, or nitro.

8. The polymer of claim 7, wherein:
each $R^1$ is, independently, —COOH, —$SO_2H$, —$SO_3H$, —$PO_3H_2$, —$PO_2H_2$, —$P(O)(OR^4)_2$, a $C_1$-$C_3$ alkyl, phenyl, a $C_1$-$C_3$ alkoxy, a $C_1$-$C_3$ alkylthio, a halo, —CN, or nitro;

each $R^3$ is, independently, —COOH, —$SO_2H$, —$SO_3H$, —$PO_3H_2$, —$PO_2H_2$, —$P(O)(OR^4)_2$, a $C_1$-$C_3$ alkyl, phenyl, a $C_1$-$C_3$ alkoxy, a $C_1$-$C_3$ alkylthio, a halo, —CN, or nitro.

9. The polymer of claim 8, wherein:
each $R^1$ is, independently, —COOH, —SO$_2$H, —SO$_3$H, —PO$_3$H$_2$, —PO$_2$H$_2$, —P(O)(OCH$_2$CH$_3$)$_2$, methyl, trifluoromethyl, methoxy, methylthio, —CN, nitro, phenyl, or fluoro; and
each $R^3$ is, independently, —COOH, —SO$_2$H, —SO$_3$H, —PO$_3$H$_2$, —PO$_2$H$_2$, —P(O)(OCH$_2$CH$_3$)$_2$, methyl, trifluoromethyl, methoxy, methylthio, —CN, nitro, phenyl, or fluoro.

10. The polymer of claim 5, wherein $R^2$ is $R^6$—COOH, $R^6$—SO$_2$H, $R^6$—SO$_3$H, $R^6$—PO$_2$H$_2$, $R^6$—PO$_3$H$_2$, P(O)(OR$^4$)$_2$, a C$_1$-C$_6$ alkyl, a C$_2$-C$_6$ alkenyl, a C$_2$-C$_6$ alkynyl, a C$_3$-C$_{10}$ cycloalkyl, a 5-10 atom heterocyclyl, a C$_6$-C$_{10}$ aryl, a 5-10 atom heteroaryl, a C$_1$-C$_6$ alkoxy, a C$_6$-C$_{10}$ aryloxy, a C$_1$-C$_6$ alkylthio, a C$_6$-C$_{10}$ arylthio, a C$_1$-C$_{10}$ sulfone, —(NR$^8$R$^9$)—, a halo, hydroxyl, —CN, nitro, or a C$_1$-C$_6$ acyl.

11. The polymer of claim 10, wherein $R^2$ is —COOH, —SO$_2$H, —SO$_3$H, —PO$_3$H$_2$, —PO$_2$H$_2$, —P(O)(OR$^4$)$_2$, a C$_1$-C$_3$ alkyl, phenyl, a C$_1$-C$_3$ alkoxy, a C$_1$-C$_3$ alkylthio, a halo, —CN, or nitro.

12. The polymer of claim 11, wherein $R^2$ is —COOH, —SO$_2$H, —SO$_3$H, —PO$_3$H$_2$, —PO$_2$H$_2$, —P(O)(OCH$_2$CH$_3$)$_2$, methyl, trifluoromethyl, methoxy, methylthio, —CN, nitro, phenyl, or fluoro.

13. The polymer of claim 1, wherein n is 1, 2, 3, or 4 and at least one instance of $R^1$ is —COOH, —SO$_2$H, —SO$_3$H, —PO$_3$H$_2$, or —PO$_2$H$_2$.

14. The polymer of claim 13, wherein the repeat unit is represented by the following structural formula:

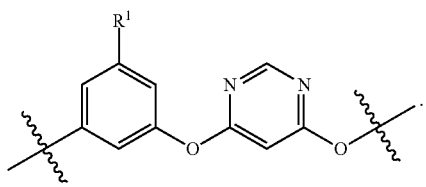

(VII)

15. The polymer of claim 13, wherein at least one instance of $R^1$ is —PO$_3$H$_2$.

16. The polymer of claim 1, wherein the polymer is a copolymer.

17. The polymer of claim 1, wherein the polymer is a homopolymer.

18. The polymer of claim 17, wherein the polymer is a homopolymer having a repeat unit according to any one of the structural formulas depicted below:

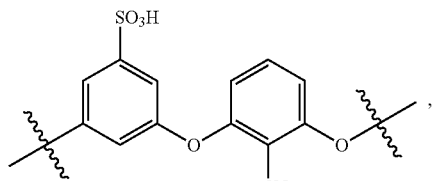

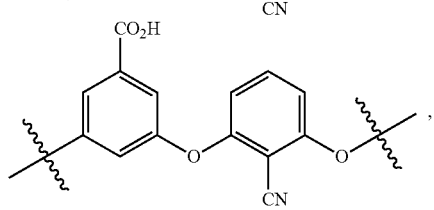

-continued

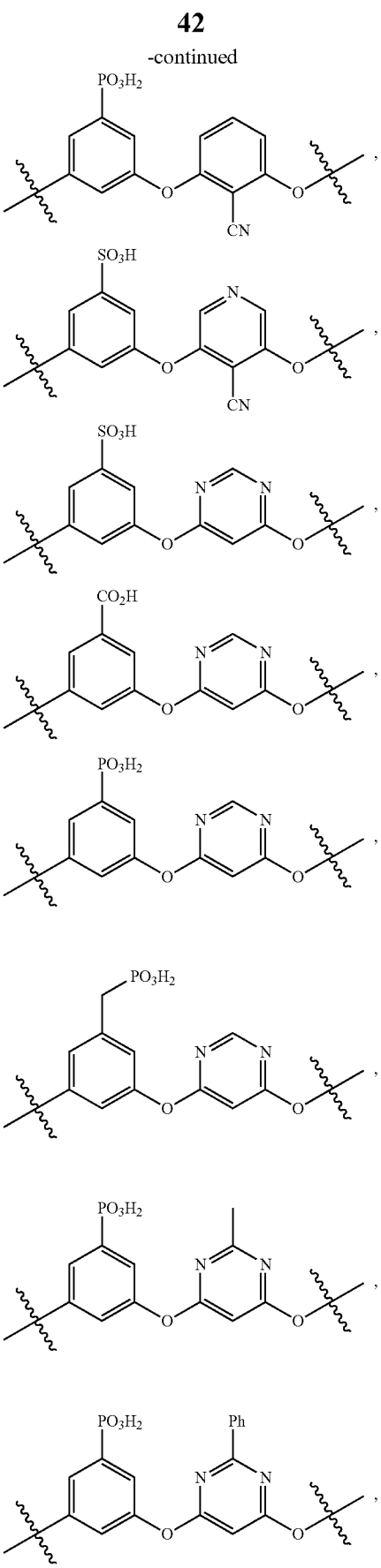

-continued
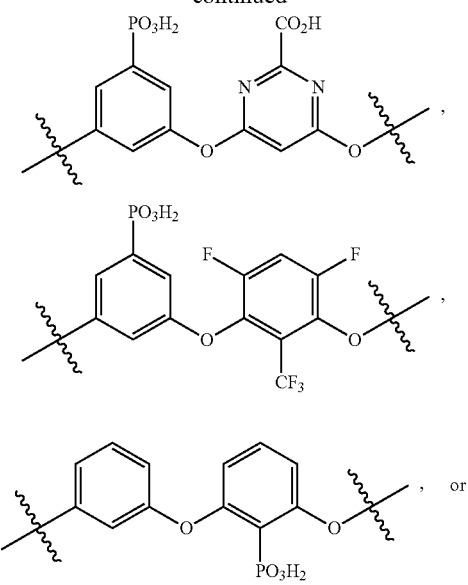
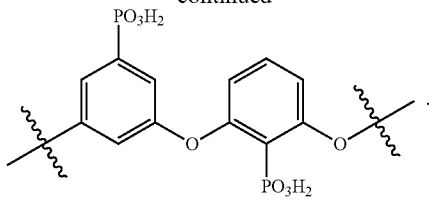
19. The polymer of claim 18, wherein the repeat unit is represented by the following structural formula:
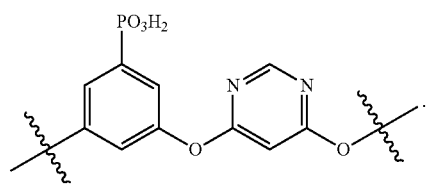
20. An ion conducting membrane comprising the polymer of claim 1.
* * * * *